United States Patent [19]

King et al.

[11] Patent Number: 4,792,906
[45] Date of Patent: Dec. 20, 1988

[54] NAVIGATIONAL APPARATUS AND METHODS FOR DISPLAYING AIRCRAFT POSITION WITH RESPECT TO A SELECTED VERTICAL FLIGHT PATH PROFILE

[75] Inventors: Ethmer W. King, Federal Way; David S. Yotsuuye; Robert C. Kircher, Jr., both of Renton; Mohammed R. Radfar, Kirkland, all of Wash.

[73] Assignee: The Boeing Company, Seattle, Wash.

[21] Appl. No.: 902,417

[22] Filed: Aug. 29, 1986

[51] Int. Cl.$^4$ .............................................. G06F 15/50
[52] U.S. Cl. .................................... 364/433; 364/448; 244/186
[58] Field of Search ............................. 364/428–430, 364/433, 434, 443, 444, 448; 73/178 T; 340/951, 959, 967, 970, 977, 979; 244/183, 185, 186

[56] References Cited

U.S. PATENT DOCUMENTS

| | | | |
|---|---|---|---|
| 3,666,929 | 5/1972 | Menn | 364/428 |
| 3,705,306 | 12/1972 | Lydon et al. | 364/433 |
| 3,740,004 | 6/1973 | Doniger et al. | 364/433 |
| 3,752,967 | 8/1973 | Vietor | 364/448 |
| 3,980,258 | 9/1976 | Simeon | 364/448 |
| 4,021,009 | 3/1977 | Baker et al. | 364/433 |
| 4,086,632 | 4/1978 | Lions | 364/444 |
| 4,387,360 | 6/1983 | Jourdan et al. | 364/433 |
| 4,413,322 | 11/1983 | Foster et al. | 364/448 |

Primary Examiner—Gary Chin
Attorney, Agent, or Firm—Hughes, Cassidy & Multer

[57] ABSTRACT

An aircraft navigational system for providing a geometic display to the pilot of the vertical position of the aircraft relative to a selected vertical flight path profile as the aircraft progresses between its departure and destination. The vertical profile, which has a climb portion, a cruise portion and a descent portion, is formed by a number of navigational points, each of which is defined by an altitude component and a geographical position component. The profile points which form the climb and descent profiles are calculated from controller assigned altitude and waypoint constraints as well as from airspeed and altitude operating limitations which define various selected aircraft performance climb and descent modes.

14 Claims, 15 Drawing Sheets

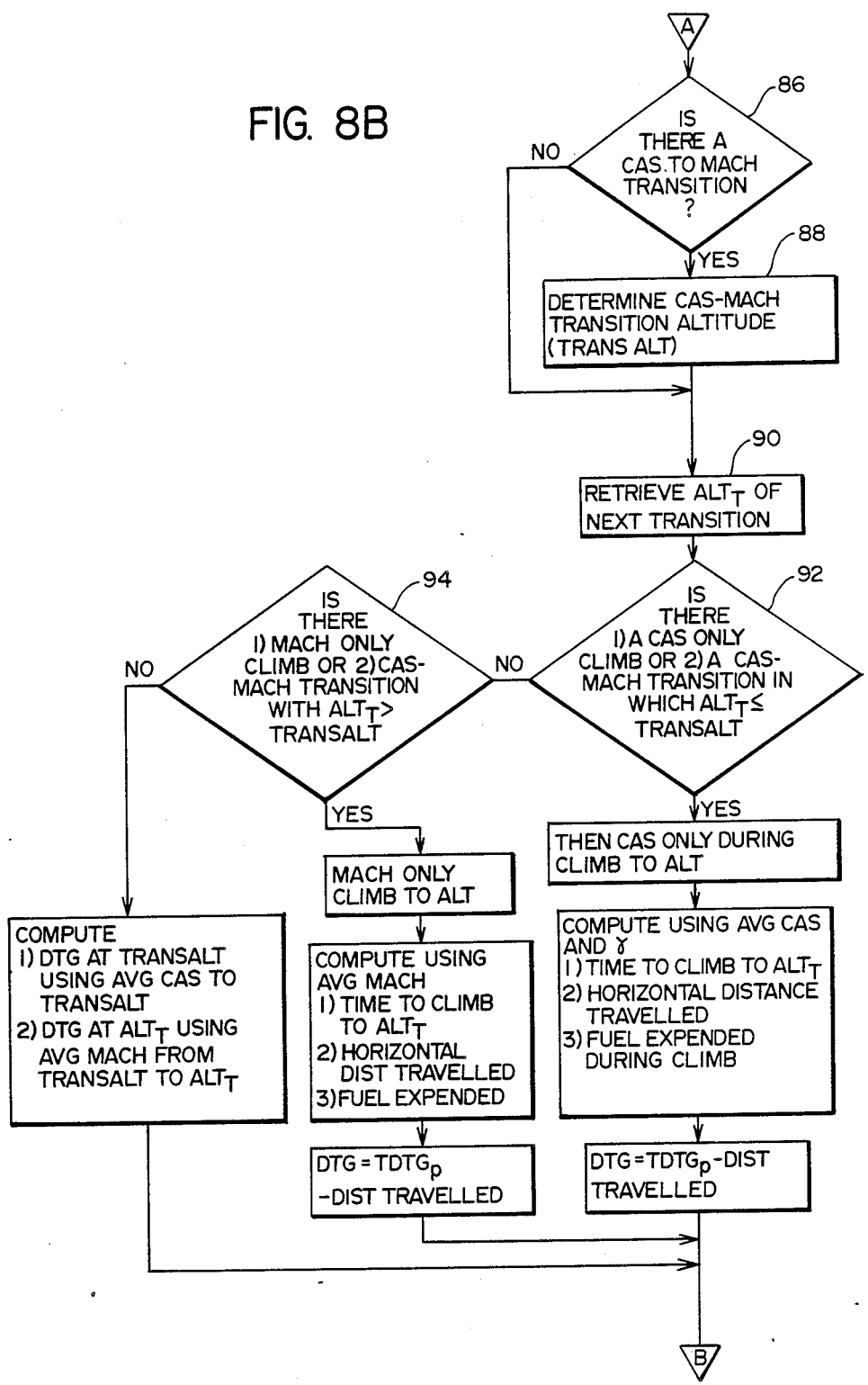

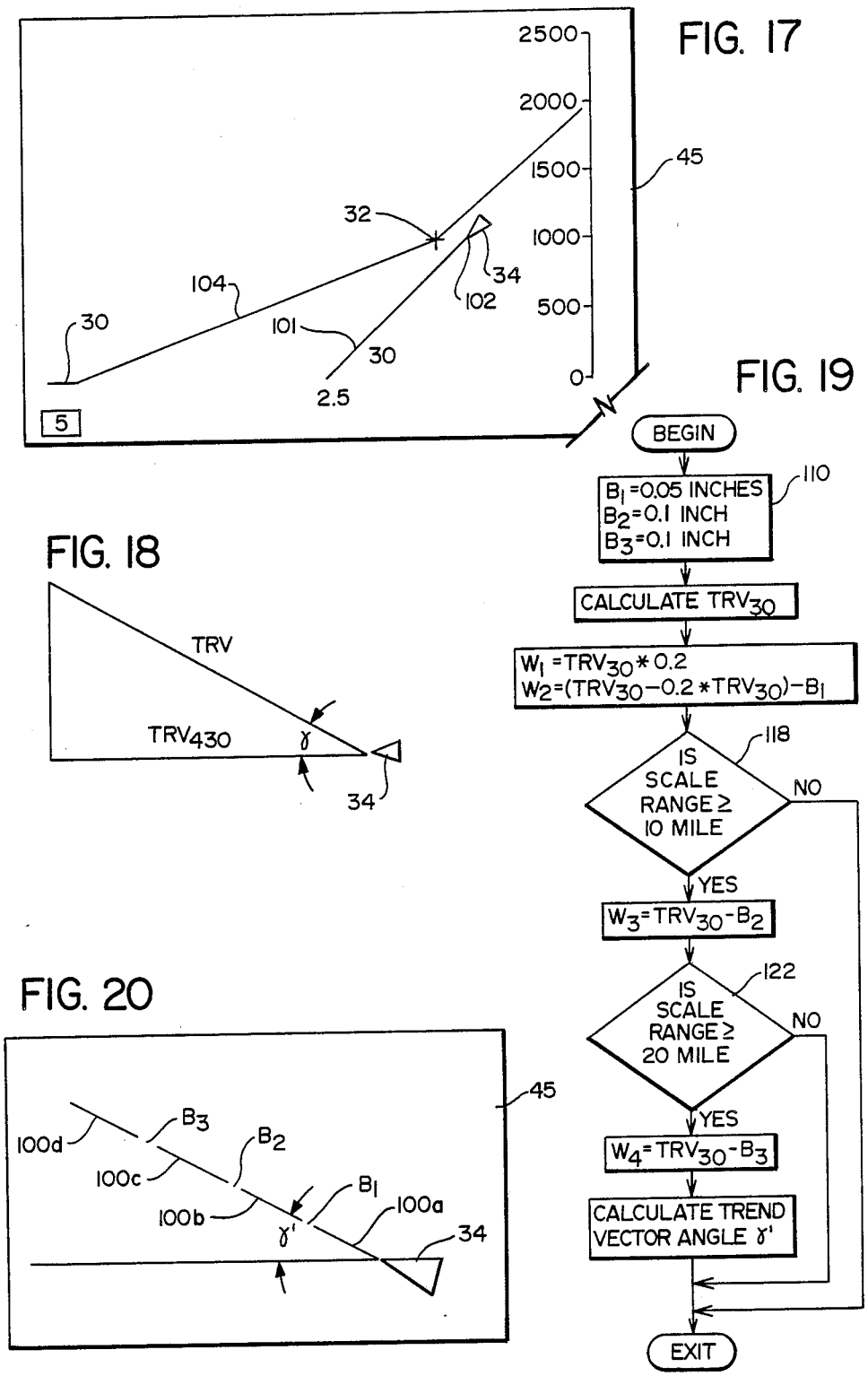

NAVIGATIONAL APPARATUS AND METHODS FOR DISPLAYING AIRCRAFT POSITION WITH RESPECT TO A SELECTED VERTICAL FLIGHT PATH PROFILE

TECHNICAL FIELD

The present invention relates to an aircraft navigational system including a CRT map display of aircraft position with respect to a selected vertical flight path profile.

BACKGROUND OF THE INVENTION

Many of the latest commercial passenger aircraft utilize computer controlled cockpit CRT displays which provide both a numerical and map presentation to the pilot of aircraft navigational data. Cockpit displays which show the horizontal position of the aircraft relative to a selected path have been disclosed in Applicants' co-pending application Ser. No. 716,979, now U.S. Pat. No. 4,692,869, filed Mar. 28, 1985 and entitled "AIRCRAFT NAVIGATIONAL SYSTEMS AND METHODS FOR CREATING NAVIGATIONAL GUIDE POINTS". Furthermore, Applicants have also disclosed a cockpit display which shows the position of the aircraft relative to a selected descent profile in their co-pending application Ser. No. 811,283 filed December 20, 1985 and entitled "AIRCRAFT DESCENT GUIDE SYSTEM AND METHOD FOR CREATING DESCENT GUIDANCE INFORMATION". An area navigation system for displaying aircraft position with reference to a selected horizontal path was disclosed in U.S. Pat. No. 4,086,632 by Lions, and which was assigned to the Assignee of the present invention.

Navigation systems for generating vertical navigational information have also been disclosed. For example, in U.S. Pat. No. 4,012,626 by Miller et al there is disclosed an area navigation system for generating pitch command signals for controlling the vertical flight path of an aircraft.

In addition, Baker et al., in U.S. Pat. No. 4,021,009 discloses an area navigation system which generates flight path angle data for display at a cockpit vertical deviation indicator.

SUMMARY OF THE INVENTION

The present invention pertains to an aircraft navigational system for displaying the vertical position of an aircraft relative to a vertical flight path. The navigation system includes position locating means for determining a geographical location and altitude of the aircraft, and for generating a first output of this geographical location and altitude. Also included are computing means, which are responsive to the first output, and which define a location of the aircraft by an altitude component and a geographical component. The computing means also generate a plurality of navigational points which form a selected vertical flight path having a climb portion, a cruise portion and a descent portion, in a manner that each of the navigational points is defined by an altitude component and geographical component. The computing means compare the altitude component of a selected one of the navigational points of the vertical flight path with the altitude component of the aircraft location to generate a second output which constitutes a difference between these altitude components. The computing means also compares the geographical component of the selected navigational point with the geographical component of the aircraft location to generate a third output which constitutes a difference value between the geographical components. Also included in the invention are display means for generating a first visual symbol of the aircraft position and a plurality of second visual symbols of the navigational points which form a visual flight path. The display means displays the first symbol and the second symbols at relative locations to each other in response to the second output and the third output.

It is an object of the present invention to provide a navigational system in which aircraft vertical position with respect to a selected vertical flight path profile is displayed to the pilot in order to aid in maintanning the vertical position of the aircraft with respect to the vertical flight path profile.

BRIEF DESCRIPTION OF THE DRAWINGS

These and other objects and advantages of the present invention will become more readily apparent after reading the following Detailed Description and upon reference to the attached Drawings, in which:

FIGS. 8A, 8B and 8C are flow charts explaining the generation of the climb portion of the vertical profile;

FIG. 17 is a diagram showing the position of the aircraft symbol relative to the descent profile and including a trend vector showing the predicted position of the aircraft from its present position at a selected future time;

FIG. 18 is a diagram illustrating the trend vector angle $\gamma$;

FIG. 19 is a flow chart explaining the generation of the trend vectors; and

FIG. 20 is a diagram showing the display of the 6, 30, 60 and 90 second trend vectors.

Figure 1:
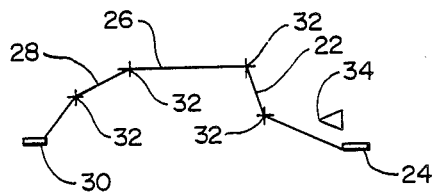
FIG. 1 is a schematic representation of aircraft position with respect to a vertical flight path by means of a CRT display of an aircraft symbol and a selected vertical flight path profile.

While the present invention is susceptible of various modifications and alternative forms, specific embodiments thereof have been shown by way of example in the Drawings and will herein be described in detail. It should be understood, however, that it is not intended to limit the invention to the particular forms disclosed, but on the contrary, the intention is to cover all modifications, equivalents, and alternatives falling within the spirit and scope of the invention.

DETAILED DESCRIPTION OF THE INVENTION

I. INTRODUCTION

The present invention pertains to a navigation system for generating a vertical profile, including climb, cruise and descent portions, of a selected aircraft flight path, and for displaying this profile in a map-like display in the aircraft cockpit. The position of the aircraft as it proceeds on its route of flight, is also displayed relative to the aforementioned vertical profile.

As shown in FIG. 1, the profile includes a climb portion 22 from a departure airport 24, a cruise portion 26, and a descent portion 28 to a destination airport 30. The profile is formed by individual path segments which join profile points 32. The vertical position of the aircraft relative to the vertical profile is shown by an aircraft symbol 34, which in FIG. 1 illustrates the position of the aircraft at a location above the climb portion 22 of the flight path profile.

It can be appreciated that there are numerous advantages to displaying aircraft vertical position with respect to a selected vertical profile. When the aircraft is operating at lower altitudes, for example, it is a primary objective of the pilot to keep the aircraft operating safely above the ground and above ground related objects such as radio towers, etc. Conventionally aircraft altitude above the ground was provided to the pilot either by the aircraft radar altimeter which displayed a numerical readout of aircraft altitude, or by a pressure altimeter which displayed a numerical readout of aircraft altitude above sea level. Where the numerical readouts of conventional aircraft altimeters were subject to being misread, the present invention provides a pictorial display of aircraft vertical position relative to a recommended flight path profile.

II. OPERATION OF THE AIRCRAFT NAVIGATION SYSTEM

Figure 2:
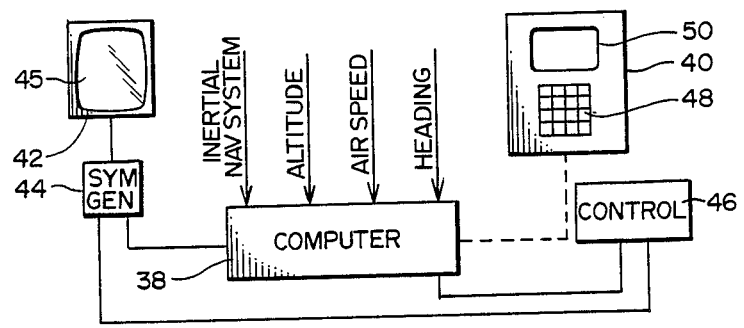
FIG. 2 is a diagram of the main elements of the navigational system of the present invention.

In order to display the vertical profile information, there is shown in FIG. 2 an aircraft navigational system including conventional components such as a digital computer 38 interconnected with (i) a data input device 40, hereinafter referred to as a control display unit (CDU), and (ii) a horizontal situation indicator 42. Horizontal situation indicator 42 (HSI) includes a symbol generator 44 as well as a cathode ray tube (CRT) screen 45 for the geometric display of NAVAIDS, navigational waypoints, profile points 32, aircraft route of flight, and other navigational data. A symbol generator control unit 46 is provided to manually select the desired range/altitude scale and display mode on screen 45. CDU 40 and screen 45 are located in the aircraft cockpit for use by the pilot. Control display unit 40 includes an alphanumeric keypad 48, with dedicated mode keys which operate as a primary method for entering navigational data into computer 38 during inflight operation as well as for controlling the display of geometric data at CRT screen 45 and alphanumeric data at a display screen 50 of CDU 40.

Computer 38 is interconnected with the aircraft's inertial navigation system (INS) as well as with various sensor systems aboard the aircraft which make measurements such as aircraft altitude and airspeed, and then relay this information to computer 38. Conventional navigational and position data is supplied from computer 38 to symbol generator 44 which generates the required symbology and interface signals for display at HSI 42. The display at HSI 42 includes three modes which are selected at symbol generator control unit 46, namely, (i) a map mode wherein the aircraft position is dynamically displayed relative to the flight path and to other earth referenced data such that the display is dynamically changing around the aircraft in a top to bottom direction to display bottom to top forward progress of the aircraft along the route of flight, (ii) a plan mode wherein a portion of the flight plan route is displayed statically in reference to a selected waypoint along the route, and (iii) the vertical profile mode of the present invention for displaying the left to right movement of the vertical profile relative to a fixed position of the aircraft symbol 34 on the screen. This provides the illusion of right to left movement of the aircraft symbol 34 across the screen relative to the vertical profile.

Preferably the aircraft navigational system of the present invention utilizes air navigational equipment currently aboard the Boeing 757/767 aircraft as of July, 1986. This navigational equipment includes a Sperry flight management computer, a Sperry control display unit, a symbol generator, part number 622-5045-201, manufactured by Rockwell International, Collins Division, and a CRT manufactured by Rockwell.

Figure 3:
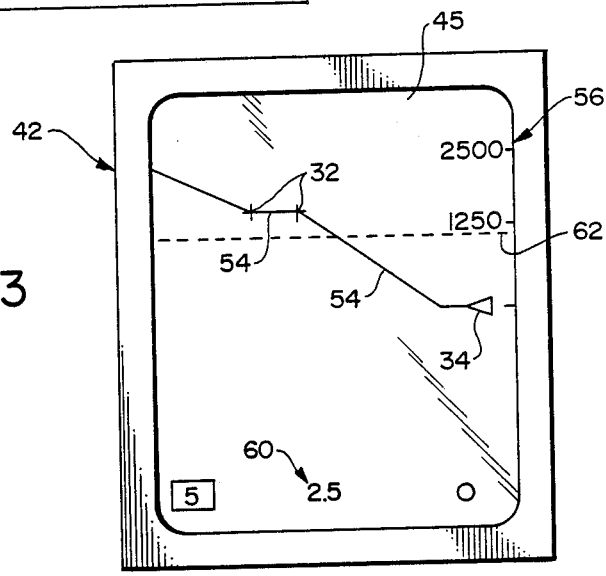
FIG. 3 is a schematic representation of a climb portion of the vertical flight path profile, and the presentation of selected altitude and horizontal range scales.

Utilizing the preferred aircraft navigational equipment, there is shown in FIG. 3 a vertical profile mode presentation of the vertical flight path profile at HSI 42. In order to provide a vertical display of geometric symbols representing the projected aircraft vertical flight path, there are shown segment lines 54 which join two or more profile points 32 across the screen; each profile point 32 being defined by a known altitude and a known geographical location. It should be appreciated that the flight path may also be defined by one or more waypoints having assigned altitude constraints. A waypoint is typically a NAVAID which is stored in computer 38 as a latitude and longitude, or a point having a known bearing and distance from the NAVAID.

In order to provide a visual display of the vertical position of the aircraft relative to the projected vertical flight path along the aircraft route of flight, the aircraft symbol 34 is located at a fixed position at the right side of the screen midway between the upper and lower edges of the screen. Continuous inputs from the aircraft's inertial navigation system are sent to computer 38 to provide data for determining the horizontal, i.e. or geographical position of the aircraft. relative to the calculated profile points 32. Altitude inputs from the aircraft altimeter are provided to determine the vertical position of the aircraft relative to the profile points 32. These geographical location and altitude inputs are used to position the vertical profile on the screen 45 relative to the fixed aircraft symbol 34 in a manner to be discussed later. During inflight operation of the aircraft, the pilot monitors and corrects for changes in aircraft position relative to the vertical profile by viewing screen 45.

III. GENERATION OF THE VERTICAL FLIGHT PATH PROFILE

In accordance with the present invention, manipulation of CDU keypad 48 (FIG. 2) generates all or a portion of the vertical profile shown in FIG. 1. More particularly, the display which is generated at CRT screen 45 (FIG. 3), includes a vertical tape indicated at 56 at the right side of screen 45, of altitude above sea level. Altitude tape 56 includes a number of horizontal altitude marks which are identified at selected intervals by numerals. The altitude tape 56 moves vertically relative to the fixed airplane symbol 34 to provide a value of aircraft altitude, profile altitude. and the altitude. if any, which separates the two. Across the lower portion of the display is a horizontal tape, generally indicated at 60, of the range scale selected at selector unit 46. Zero miles is indicated at tape 60 by the numeral 0 below the aircraft symbol 34, while the range value displayed in the box in the lower left corner of the screen 45 represents the total range scale look ahead being displayed. e.g. five miles in FIG. 3.

Vertical scaling of the altitude tape 56 varies as a function of the range scale 60 selected. For example. with a 2.5 mile range scale selected, the vertical scale extends from 0 to 2500 feet, whereas for a five mile horizontal range selection, the vertical scale extends to 5000 feet. In addition, minimum enroute altitude, minimum safe altitude and other pertinent altitudes can be displayed on the screen by a dashed horizontal line 62 corresponding to their proper location on the altitude tape 56.

Figure 4:
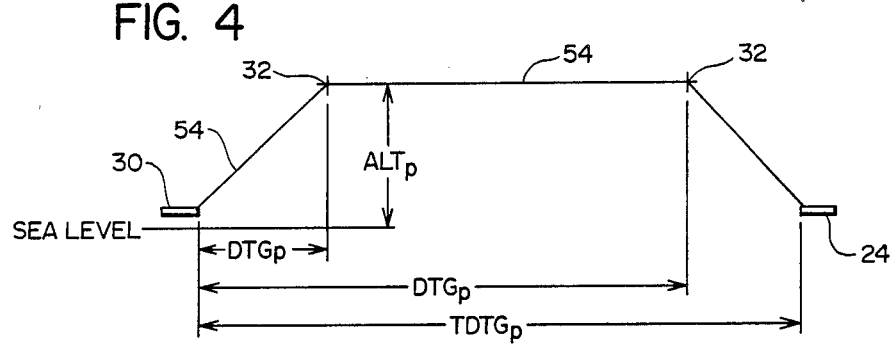
FIG. 4 is a diagram showing the formation of the vertical flight path profile by a number of profile points as well as departure and destination airports, each of which is defined by a distance and altitude.

As mentioned previously, the vertical profile is divided into climb, cruise and descent profile portions, each of which is generated in a manner to be described later. Broadly, in order to generate the vertical flight path profile, reference is made to FIG. 4 in which the profile is formed by the departure airport 24, destination airport 30, and a number of the intermediate profile points 32, as well as line segments 54 interconnecting the profile points 32 and the profile points with the airports. Each of the profile points 32, as well as the departure airport 24, are defined in the profile as a horizontal distance (DTGP) along the route of flight from the destination airport 30, the distance between the departure airport 24 and destination airport 30 being defined as a total distance to go, $TDTG_P$ along the route of flight. Furthermore, each of the profile points 32 is further defined as an altitude, $ALT_P$, above sea level.

It should be appreciated that while some of the aircraft flight path will be dictated by certain altitude constraints at known waypoints, the aircraft may be required to operate in accordance with other airspeed/altitude restriction which are not referenced to a fixed geographical location. A typical waypoint/altitude constraint may be an instruction to climb to and maintain 5000 until beyond 10 miles of the departure airport NAVAID. On the other hand, a typical aircraft operating limitation is the aviation rule that an aircraft may not exceed 250 knots indicated airspeed (KIAS) below 10,000 feet altitude. Typically, once reaching 10,000 feet the aircraft will accelerate and climb out at a greater airspeed but at a lower altitude rate. thus there is a change in the vertical profile. The 10,000 foot/250 KIAS transition is not a geographical limitation, that is, this transition is altitude and airspeed dependent, rather than geography and altitude dependent as was the aforementioned waypoint/altitude constraint. However, in order to be displayed as a vertical profile for aircraft altitude control, these aircraft operating limitations, as well as the waypoint/altitude constraints are defined by the parameters of (1) distance from the destination airport, $DTG_P$ and (2) altitude above sea level, to form the profile points 32 of the present invention.

In order to locate each of the profile points 32, the distance DTGP of each of the profile points 32 to the destination airport 30 is calculated. This is accomplished by subtracting the projected horizontal distance which the aircraft will travel from the departure airport 24 to each of the airspeed/altitude restrictions or waypoint/altitude constraints, from the total distance to go $TDTG_P$. The resulting values of DTGP together with the altitudes above sea level, $ALT_P$, of the airspeed/altitude restrictions or waypoint/altitude constraints, define each of the profile points 32 which form the vertical profile.

The calculation of the profile as a series of profile points, each of which is defined as $DTG_P$, $ALT_P$ pair, will be discussed beginning with the calculation of the climb profile. As discussed previously, there may be a number of restrictions placed on the operation of the aircraft during climb. For example, aircraft indicated airspeed is restricted to a maximum of 250 knots until the aircraft reaches 10,000 feet, whereafter aircraft speed may be increased; this is known as the 250 KIAS (knots indicated airspeed)/10,000 foot transition. Therefore, at 10,000 feet, the vertical profile will change and form a shallower segment as typically the engines are throttled up and the aircraft is climbed at a lower vertical rate and at a higher airspeed. Once above 10,000 feet, it is typical for the aircraft to fly a selected calibrated airspeed (CAS); calibrated airspeed being equal to indicated airspeed corrected for any known instrument error. The selected calibrated airspeed is flown until a selected MACH number is reached, where that MACH number is then flown until cruise altitude is reached; this transition being known as the CAS/MACH transition. After the CAS/MACH transition, when the selected MACH is being flown, the angle of aircraft climb is typically less than it was before the CAS/MACH transition. Further climbout requirements may be set by the type of aircraft operation desired during climb. For example, there may be an economy climb for optimum fuel conservation, an engine out climb in the event the aircraft has to operate on less than all engines, a manual climb, a cruise step climb, as well as other climb modes which will not be discussed herein. Additional climb waypoint/altitude constraints may be set by the standard instrument departure or by area traffic controllers.

Figure 5:
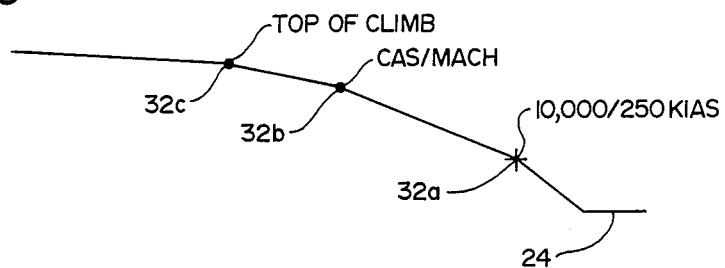
FIG. 5 is a diagram of an exemplary climb mode having 10,000/250 KIAS transition, a CAS/MACH transition and a top of climb transition.

For example, a typical climb out might combine a manual climb at 250 KIAS to 10,000 feet, followed by an economy climb to cruise altitude in which a selected airspeed is maintained, e.g. 350 knots leaving 10,000 feet until a selected MACH number, e.g. 0.80, is intercepted and then maintained until reaching a cruise altitude e.g. flight level 350. In the aforementioned exemplary climbout, shown by way of example in FIG. 5, in which there are no instrument departure or traffic controller waypoint/altitude restrictions, the $DTG_P$, $ALT_P$ pairs defining three profile points are determined. That is, the $DTG_P$, $ALT_P$ pairs for (i) the 250 knot/10,0000 foot transition, (ii) the CAS/Mach transition, and (iii) the top of climb to cruise transition are calculated.

In order to calculate the $DTG_P$, $ALT_P$ pair for the 10,000/250 knot transition, the horizontal distance traveled by the aircraft from the departure airport to 10,000 feet is first calculated and then this value is subtracted from the value of the total distance $TDTG_P$ along the route of flight between the departure and destination airports. The value of $TDTG_P$ is computed in a conventional manner from the flight plan information stored in computer 38 which defines the horizontal route of flight between the destination and departure airports.

On the other hand, the horizontal distance traveled while climbing to 10,000 feet is a function of the prevailing winds, the horizontal component of aircraft airspeed, and the time for the aircraft to reach 10,000 feet. In order to determine the horizontal and vertical components of the selected calibrated airspeed, aircraft flight path angle is obtained from computer 38, flight path angle having been calculated in a conventional manner from the aircraft weight, selected aircraft thrust and selected calibrated airspeed. Utilizing flight path angle, the horizontal and vertical components of calibrated airspeed are determined in a conventional manner using standard trigonometry. The vertical component of calibrated airspeed is then used to compute the time to climb to 10,000 feet. Then, the horizontal distance which the aircraft travels climbing to 10,000 feet is determined by multiplying the horizontal component of calibrated airspeed by the time to climb to 10,000 feet. The $DTG_P$ of the first profile point is then determined by subtracting the horizontal distance traveled from the value of $TDTG_P$. The resulting value of $DTG_P$ is then paired with the assigned altitude of 10,000 feet to form the $DTG_P$, $ALT_P$ pair for that airspeed/altitude restriction.

Calculation of the $DTG_P$, $ALT_P$ pair for the next profile point 32b (FIG. 5), i.e. the CAS/MACH transition, is accomplished by first calculating the transition altitude (TRANSALT) where the selected CAS intercepts the selected MACH number. This is a conventional calculation performed by computer 38 based upon the CAS and MACH airspeed as well as atmospheric conditions of standard temperature and pressure. Once the transition altitude is known, the horizontal distance traveled between profile point 32a and profile point 32b is calculated in a manner similar to that with respect to the calculation of the distance traveled from the departure airport 24 to profile point 32a. The DTG of profile point 32b is then determined by subtracting the total distance traveled to profile point 32b via profile point 32a, from the quantity $TDTG_P$; the calculated transitional altitude TRANSALT completing the $DTG_P$, $ALT_P$ pair for profile point 32b.

In order to calculate the $DTG_P$, $ALT_P$ pair for the third waypoint 32c (FIG. 5), i.e. the top of climb transition, the distance traveled between profile point 32b and profile point 32c is calculated in a manner described previously with regard to the calculation of the horizontal distance between profile point 32a and profile point 32b, except that the assigned MACH rather than CAS is used to calculate the distance travelled. The altitude component of the $DTG_P$, $ALT_P$ pair is the assigned cruise altitude.

Having described the calculation of an exemplary climb profile, a description of the calculation of an exemplary descent profile follows. During descent, it is common to have both waypoint/altitude constraints, as well as aircraft operating limitations such as the transition at 10,000 feet to a maximum speed of 250 KIAS. In an exemplary embodiment, an optimum clean, idle descent guideslope is calculated which meets aviation regulations regarding maximum airspeed below 10,000 feet, as well as meets requirements for optimum fuel efficiency. A series of aircraft descent transitions are utilized to define the descent guideslope in terms of transition aircraft altitudes and airspeeds, and which are further calculated as $DTG_P$, $ALT_P$ pairs to form the profile points of the descent guideslope. These altitude/airspeed transitions, shown in FIG. 6 and identified by cardinal numbers 1 through 5, define a clean, idle descent guideslope wherein the aircraft cruise MACH airspeed is maintained during descent from cruise altitude (#1) until a cruise MACH/calibrated airspeed transition is reached (#2), and whereupon the calibrated airspeed is maintained in a further descent; this being known as the descent MACH to CAS transition. As is generally known, by holding a constant MACH during descent from cruise altitude, the calibrated airspeed increases. Upon reaching the calibrated airspeed of the cruise MACH to CAS transition (#2), the aircraft angle of descent is decreased to maintain that calibrated airspeed. The calibrated airspeed is maintained until approaching the 10,000 foot altitude (#3) where airspeed is slowed to 250 KIAS. The 250 KIAS descent airspeed is maintaieed until approaching an end of descent waypoint/altitude constraint (#4), such as the outer marker in an instrument approach, where the airspeed is slowed to the end of descent airspeed e.g. 170 KIAS. The 170 KIAS approach speed is maintained until the end of approach and just prior to touchdown at the destination airport (#5).

It should be appreciated that the cruise MACH to calibrated airspeed transition (#2) may vary based upon an analysis of fuel savings versus time available to reach the aircraft destination. Furthermore, there may be additional airspeed and altitude transition requirements or waypoint/altitude constraints based upon standard instrument approach regulations or local traffic controllers.

In order to calculate the optimum descent guideslope, the upper leg of the calculated descent guideslope is defined by a top of descent transition (#1) (FIG. 6) which identifies the transition from cruise altitude, and by the cruise MACH/CAS transition (#2). The upper leg represents a cruise MACH descent which results in a constantly increasing calibrated airspeed. The altitude TRANSALT at which the assigned cruise MACH intercepts the assigned calibrated airspeed is calculated in a conventional manner. For purposes of calculating the descent guideslope however, the upper leg is approximated as a constant calibrated airspeed leg utilizing an average calibrated airspeed over the upper descent leg.

Furthermore, the upper middle leg of the calibrated descent guideslope is defined by the cruise MACH/CAS transition (#2) and the 250 KIAS/10,000 feet transition (#3); whereas the lower middle leg is defined by the 250 KIAS/10,000 feet transition (#3) and the lower waypoint (#4). The lower leg is defined by the lower waypoint (#4) and the destination airport (#5). Both middle legs and the lower leg each include a constant calibrated airspeed segment and a deceleration segment; the deceleration segment defining that portion of the leg where transition is made to the airspeed of the next lower transition.

It should be appreciated that the calculated descent guideslope of the present embodiment is somewhat curved due to the fact that during the middle legs and lower leg, a constant calibrated airspeed is maintained during the aircraft descent causing the true airspeed of the aircraft to decrease. In the upper leg a constant MACH is maintained causing the true airspeed of the aircraft to increase as the aircraft descends. In addition, a curved profile results during those deceleration segments when the aircraft slows to the speed of the next transition. Due to the fact that these descent legs have a curved profile, in order to increase the accuracy of the calibrated descent guideslope, the constant cruise MACH and constant calibrated airspeed segments are divided into a number of further subsegments by plurality of intermediate points, e.g., points A, B, C, D and E of the lower middle leg in FIG. 6. Each of these intermediate points is defined by an altitude component, alt, and a horizontal distance component, dtg, from the destination airport.

In order to calculate the DTG, ALT pair to define each profile point 32 of the optimum calculated guideslope (FIG. 6), the descent guideslope is calculated in a direction opposite to that direction in which it is flown, i.e. by starting at the destination airport (#5) and proceeding upward to the top of descent transition (#1). The segments forming the optimum descent guideslope are identified beginning with a first segment which is defined by the destination airport (#5) and the next descent profile point (#4) of that segment. This is accomplished by dividing each leg into a number of segments which are defined as dtg, alt pairs. The manner for calculating the dtg, alt pairs for each segment will depend on whether that segment is a nondecelerating segment, e.g., segment DE of the lower middle leg, or a a decelerating segment, e.g., segment AB of the lower middle leg. For example, referring to FIG. 7, calculation of the $DTG_P$, $ALT_P$ pair for the lower middle leg, e.g. 250 KIAS/10,000 foot, is briefly described. A determination is made whether the calibrated airspeed at the lower end of the lower leg first segment [TGTSPD(L)], e.g. 170 KIAS, is less than the calibrated airspeed at the upper end of the lower middle leg [TGTSPD(SPDaltPTR)], e.g. 250 KIAS. If the condition is false, i.e. the airspeed at the upper end of the lower leg is equal to or greater than the airspeed at the lower end of the first segment, then the first segment is treated as a constant airspeed (calibrated or MACH) segment, and the change in altitude component, $\Delta$alt, and change in horizontal distance component, $\Delta$dtg, of that constant airspeed segment are calculated using a constant airspeed routine to be discussed hereinafter. On the other hand, if the aforementioned condition is true and the first segment is determined to be a deceleration segment, the change in altitude component $\Delta$alt and change in horizontal distance component $\Delta$dtg of the deceleration segment are determined utilizing a deceleration routine also to be discussed hereinafter.

Once the $\Delta$dtg, $\Delta$alt pairs are determined using the constant airspeed or deceleration routines, they are added to previously stored values of dtg and alt, respectively, to generate the DTG, ALT pair which defines the profile point of the upper end of that leg. Determination is then made whether the latest calculated value of alt is equal to assigned cruise altitude. If they are equal, the descent guideslope calculation is complete and no other segments are computed. However, if the altitudes are not equal, then additional segments are required to be calculated to complete the descent guideslope. Thus, the aforementioned functional steps are repeated for the second segment (FIG. 6), by first determining whether the airspeed at the upper endpoint of the first segment, e.g. 250 KIAS, is less than the airspeed of the upper transition of the lower middle leg, e.g. 250 KIAS. If the condition is true, as it is in this example, then the next segment (second segment) is treated as a constant airspeed segment and the constant airspeed routine is used to calculate the $\Delta$alt, $\Delta$dtg pair of that segment. Once the $\Delta$alt, $\Delta$dtg pair is calculated for the second segment, they are added to the previously calculated values of alt and dtg, and then stored in their respective arrays. Calculation of $\Delta$alt and $\Delta$dtg for additional segments of that leg continues until the latest value of alt is equal to the altitude of the nex transition point.

IV. DETAILED DISCUSSION OF CALCULATION OF CLIMB PROFILE

Having discussed the generation of the exemplary climb and descent profiles somewhat broadly, a more detailed discussion of their formation is provided.

Figure 8A:
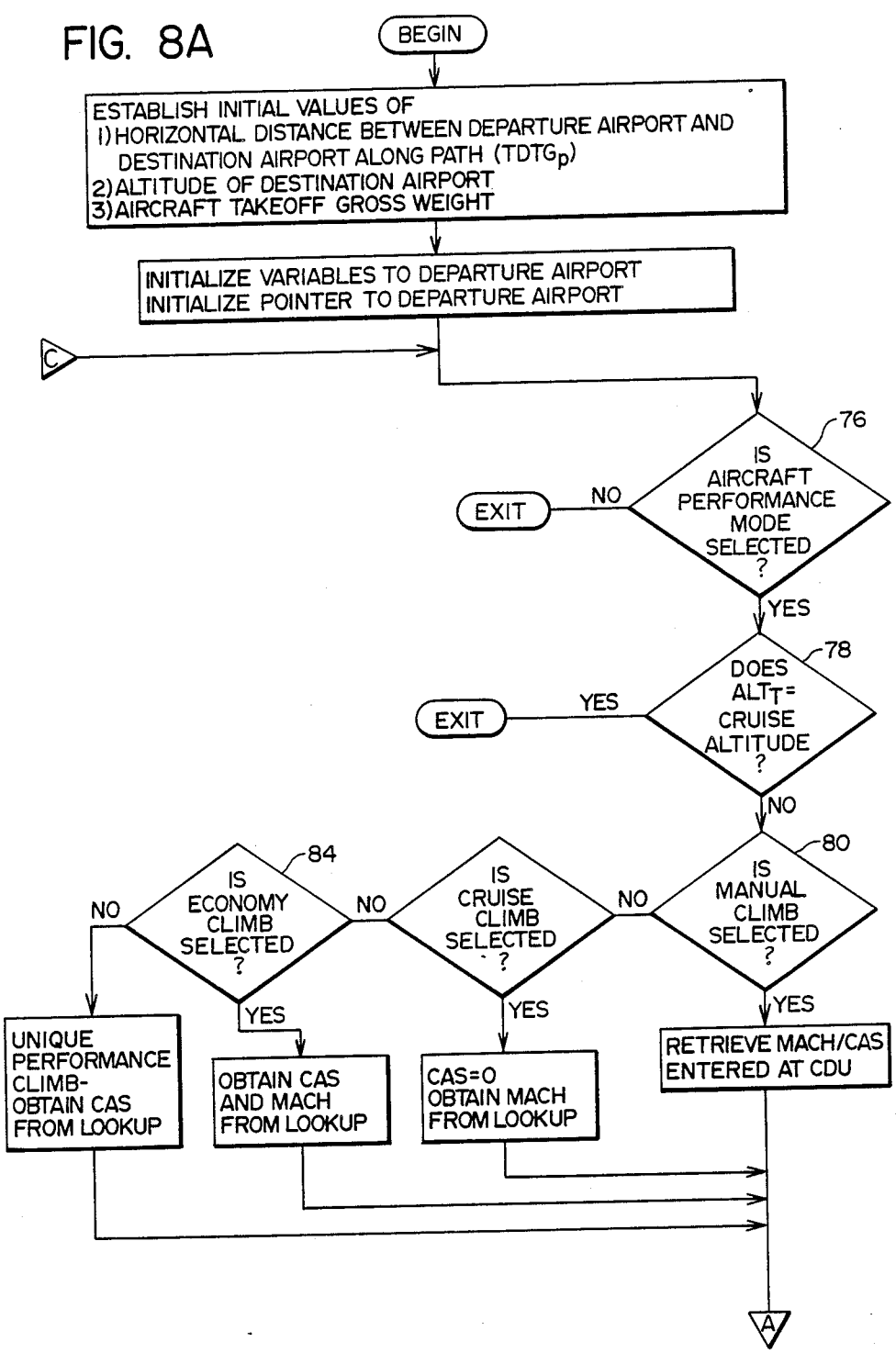
Figure 8C:
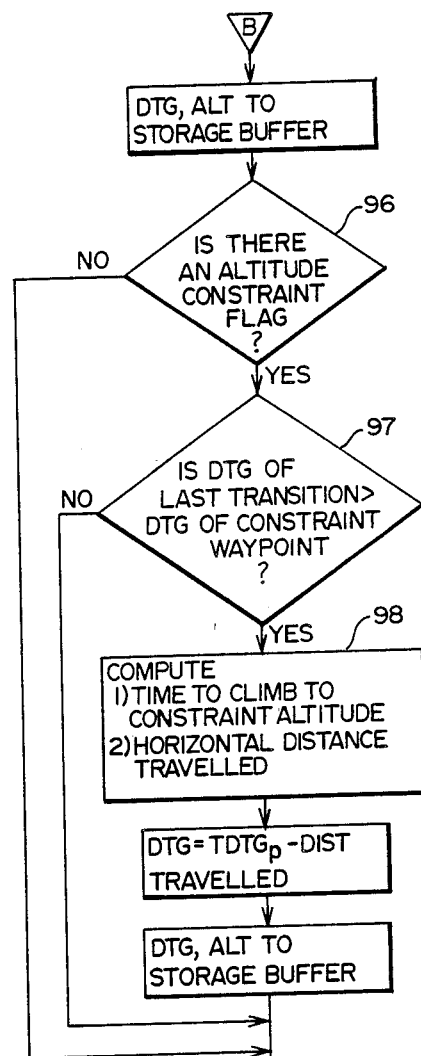
Figure 9:
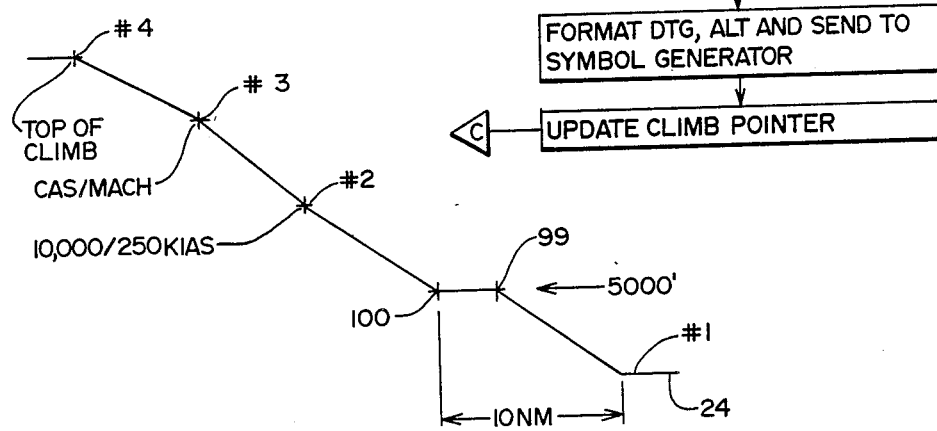
FIG. 9 is a diagram showing the airspeed/altitude transitions of an exemplary climb profile having a constraint altitude and waypoint.

To calculate the climb profile, based upon one or more selected performance modes, reference is made to the flow charts in FIGS. 8A through C and the diagram of FIG. 9. The climb profile in FIG. 9 is based on a performance mode having the following airspeed/altitude limitations, namely (i) a 10,000 foot/250 KIAS transition (#2), a CAS/MACH transition (#3), a top of climb transition (#4). Furthermore, an altitude constraint waypoint 99 is included, which for example purposes requires the aircraft not to exceed 5000 feet altitude until 10 miles from the departure airport. A calculated level off transition point 100 results if the aircraft climbs to 5000 feet prior to reaching the ten mile waypoint constraint. In this exemplary climb out, each airspeed/altitude limitation is assigned a cardinal number beginning with the number 1 at the departure airport 24. After computing the total horizontal distance to be travelled $TDTG_P$ along the flight path from the departure airport to the destination airport, as well as calling up the departure airport altitude and gross weight of the aircraft, a transition pointer is set to cardinal number 1 and the variables are initialized. At decision block 76 (FIG. 8A), a determination is made whether an aircraft performance mode for the first leg has been selected either at CDU keypad 48 or entered in the computer 38. If this condition is true, a number of decisions are made to determine whether the selected climb performance mode is (1) a manual climb in which the climb CAS and climb MACH are entered by the pilot via the CDU keypad 48, (2) an economy climb mode in which the climb CAS and climb MACH are retrieved from a lookup table in computer 38, and which are calculated in a conventional manner to obtain optimum fuel economy based upon selected cost analysis data for fuel use in climbout, (3) a cruise climb from one cruise altitude to another, or (4) a unique performance climb such as an engine out climb, maximum angle of climb, or maximum rate of climb.

If the manual climb or economy climb is selected at decision blocks 80, 84, and decision block 86 is answered in the affirmative, there will be a CAS/MACH airspeed transition in which the transition altitude (TRANSALT) is determined in a conventional manner at block 88. Otherwise, if a unique performance climb or a cruise climb is selected, there will be no CAS/MACH transition because the unique performance climb by definition is performed at a selected CAS only, whereas the cruise climb is performed at a selected MACH only. After determination of TRANSALT at block 88 in FIG. 8B, the assigned altitude of the next airspeed/altitude operating limitation is obtained from computer 38 at block 90. In the example of FIG. 9, the next operating limitation is the , 10,000 foot/250 knot transition.

Following the flow in FIG. 8B, if, at decision block 92, the selected mode is CAS only, i.e. a unique performance climb, or if the CAS/MACH transition occurs above the next transition altitude $ALT_T$, then the climb to that next transition altitude will be at the selected CAS airspeed. To calculate the $DTG_P$, $ALT_P$ pair for the next transition, the projected horizontal distance travelled from the previous profile point during the climb to the transition altitude, is calculated as was discussed previously, using the average CAS during the climb segment converted to groundspeed. In addition, the projected time to climb to the taansition altitude as well as the projected fuel expended is calculated. These values are then utilized to compute the DTG, ALT pair for the transition in a manner discussed previously, the total projected horizontal distance travelled being subtracted from $TDTG_P$ to generate $DTG_P$.

On the other hand, if the decision at block 92 is "no", then there is a further decision at block 94 as to whether the selected climb mode is either a MACH only climb or a CAS/MACH transition having a transition altitude $ALT_T$ which is greater than TRANSALT. A "yes" decision at decision block 94 means a MACH only climb for that segment in which the $DTG_P$, $ALT_P$ pair is calculated in the manner discussed with reference to the CAS only climb mode except that the average MACH number is used to calculate groundspeed in order to compute the projected distance traveled during the climb. Otherwise, a no decision at block 94 means that the segment has a CAS/MACH transition which is below the next transition altitude $ALT_T$. This might occur, for example, if the next altitude transition $ALT_T$ was the top of climb transition altitude, which is typically above the CAS/MACH transition. In this instance, the $DTG_P$, $ALT_P$ pair which defines the CAS/MACH transition are calculated using the average value of the CAS between the last transition and the CAS/MACH transition altitude (TRANSALT). This distance travelled is added to previous values of distance travelled and their sum is subtracted from $TDTG_P$ to generate $DTG_P$ for the CAS/MACH transition profile point. Then, the average MACH flown between the CAS/MACH transition altitude and the next transition altitude $ALT_T$ is utilized to calculate the horizontal distance traveled during that portion of the climb segment.

Once the $DTG_P$, $ALT_P$ pair is determined for the next airspeed/altitude transition profile point, an altitude constraint flag is checked at decision block 96 (FIG. 8C) for any waypoint/altitude constraints supplied by the instrument departure or by a controller, and which are entered as part of the original flight plan or by the pilot at the CDU keypad 48. If the altitude constraint flag is detected, a determination is made at decision block 97 whether the last computed profile point is located before the constraint waypoint. If this condition is true, then a $DTG_P$, $ALT_P$ pair defining a level off point, such as level off point 99 in FIG. 9, is calculated. This is accomplished by calculating the time to reach the constraint altitude using the vertical and horizonaal components of the selected aircraft airspeed, and then calculating a horizontal distance travelled. The calculated value of distance travelled is added to the stored values of total distance travelled and their sum subtracted from the $TDTG_P$ to generate $DTG_P$ for the level off point 99. The $DTG_P$, $ALT_P$ pair which define the constraint waypoint/altitude, designated by number 100 in FIG. 9, is then calculated using the stored latitudes/longitudes of the waypoint 100 and the departure airport, respectively, as well as the value of $TDTG_A$, to generate $DTG_P$; the altitude limitation of the waypoint completing the $DTG_P$, $ALT_P$ pair. Since the flagged waypoint/altitude constraint causes a change in the $DTG_P$, $ALT_P$ pair which define the end of the first leg, i.e. transition point #2 in FIG. 9, the value of DTG for the airspeed/altitude transition is recalculated based upon the projected horizontal distance travelled during the climb from the waypoint altitude to the altitude of transition #2.

The routine then returns to decision block 76 (FIG. 8A) to determine whether an aircraft climb mode has been selected for the next leg to calculate the $DTG_P$, $ALT_P$ pair which define the next airspeed/altitude transition. In this manner, calculation of the $DTG_P$, $ALT_P$ pair for each transition up to the top of climb transition, cardinal #4 in FIG. 9, is determined until the last transition point altttude $ALT_T$ equals cruise altitude whereby the routine is exited.

V. DETAILED DISCUSSION OF THE CALCULATION OF THE DESCENT PROFILE

Figure 6:
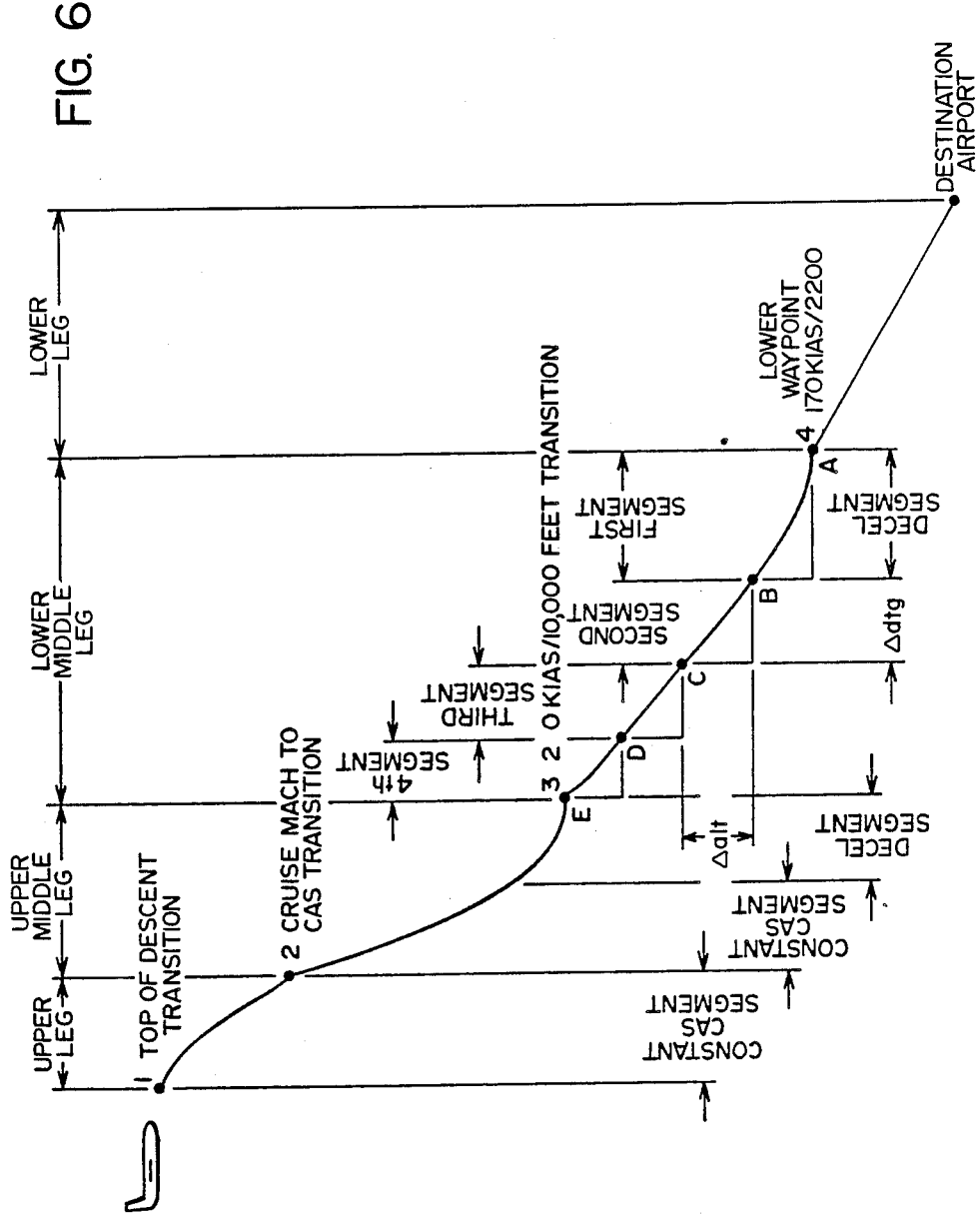
FIG. 6 is a diagram of an exemplary descent profile formed by a top of descent transition, a MACH/CAS transition, and a lower waypoint transition.
Figure 7:
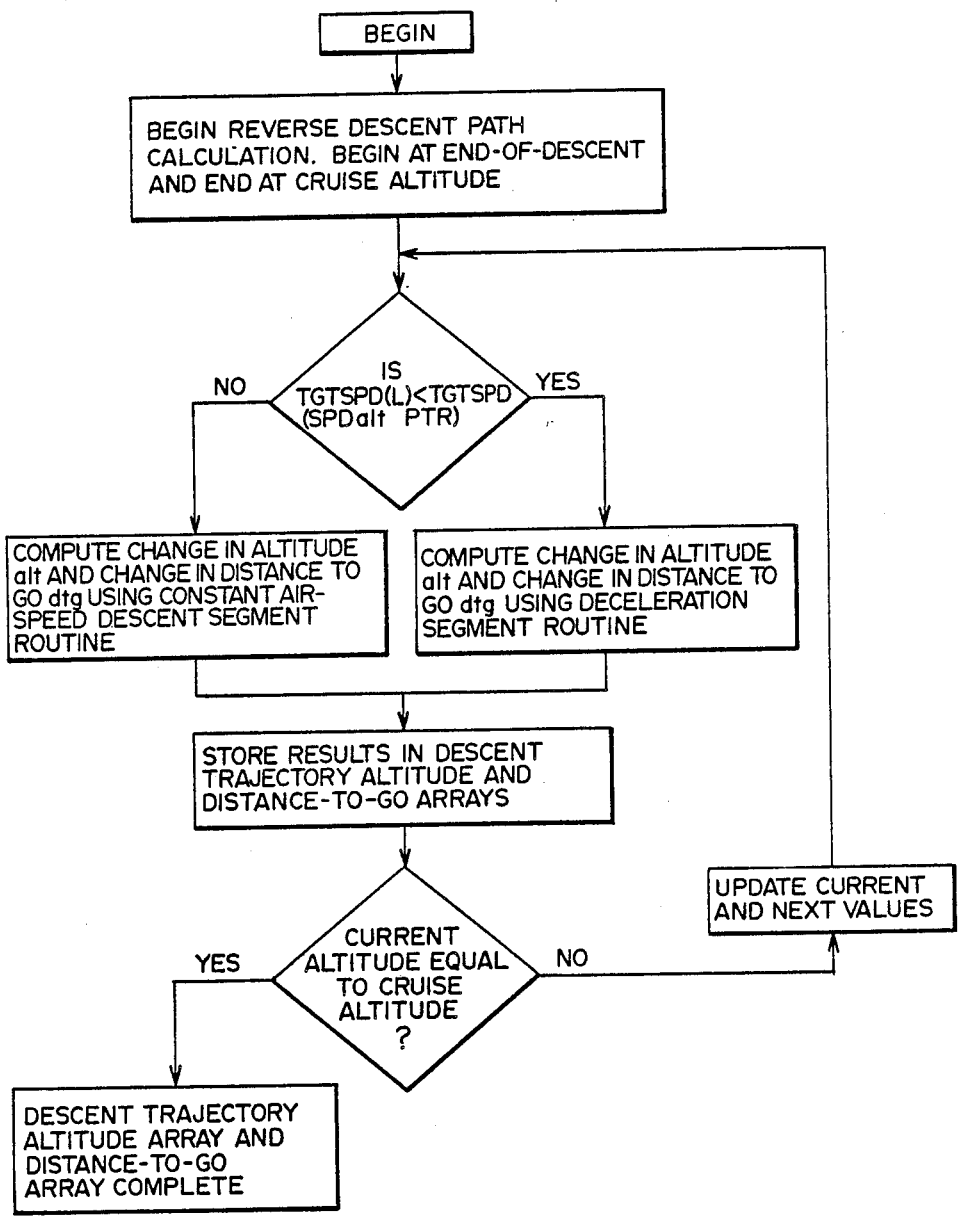
FIG. 7 is an overview flow chart showing the generation of the descent profile of FIG. 6.
Figure 10A:
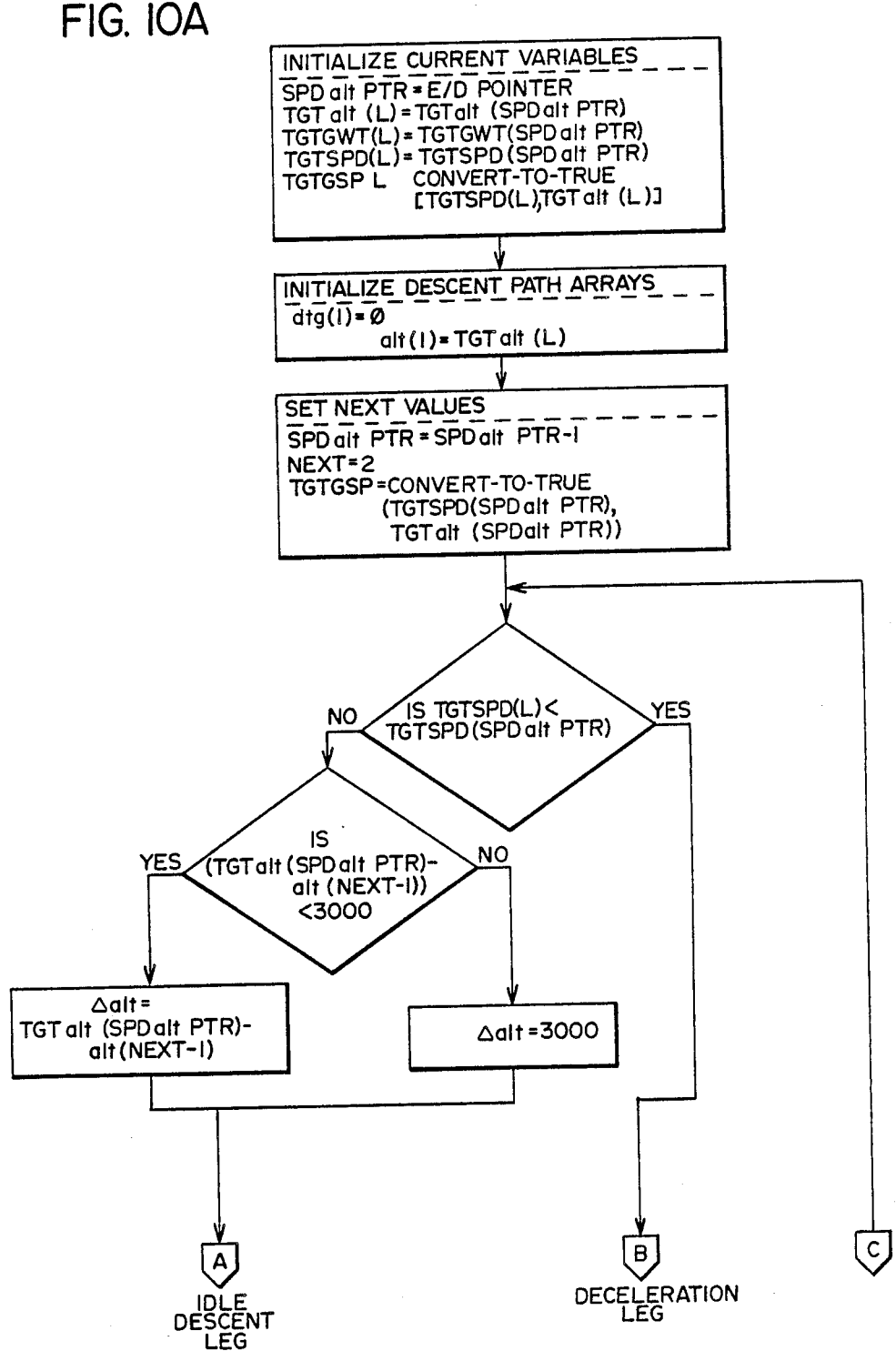
FIGS 10A and 10B are detailed flow charts explaining the generation of the descent profile.
Figure 10B:
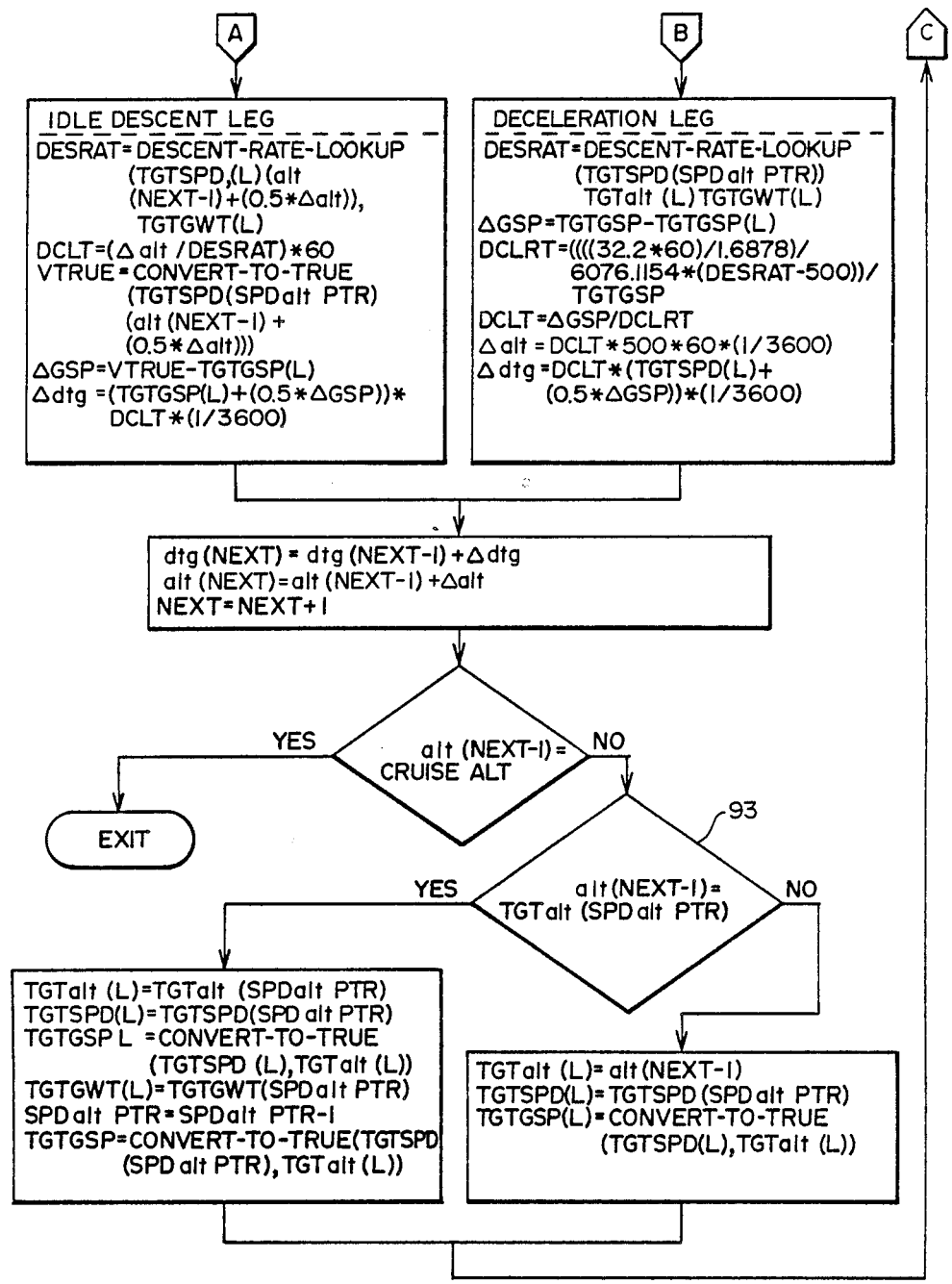

As described in the broad overview with reference to FIGS. 6 and 7, calculation of the optimum clean idle descent guideslope is accomplished by starting at the lower end of descent profile point, e.g. destination airport, and then by calculating the optimum guideslope in accordance with the assigned airspeed/altitude operating limitations and waypoint altitude constraints so that each descent leg is divided by a plurality of descent points defining either constant airspeed or deceleration segments. Referring to the flow chart in FIGS. 10A and 10B, after the current variables as well as the dtg and alt arrays have been initialized, a descent leg index pointer (SPDaltPTR=SPDaltPTR−1) is defined, and aircraft airspeed (TGTSPD) is converted to true airspeed based upon the current aircraft altitude at the first segment lower end point. The index pointer is initialized to the cardinal number of the destination airport e.g. #5 (FIG. 6). The airspeed/altitude transitions are assigned sequential cardinal numbers wherein the transition occurring at the destination airport is assigned the highest number, and the top of descent transition is assigned the number "1". Therefore, in the exemplary embodiment, the descent leg index pointer initially accesses the destination airport (#5), and then in succession accesses lower waypoint (#4), the 10,000/250 KIAS transition (#3), the cruise Mach to CAS transition point (#2), and the top of descent transition (#1).

As discussed previously, a determination is made whether the first segment of the lower leg (FIG. 6) is a deceleration segment or a constant airspeed segment. If the condition is satisfied that the first segment is a deceleration segment, the deceleration rate of the aircraft is determined based upon a 500 foot per minute aircraft descent rate during deceleration from the higher airspeed [TGTSPD (SPDaltPTR)] for that leg to the lower aircraft airspeed [TGTSPD(L)] assigned to that leg. The deceleration rate (DCLRT) in knots per second is calculated as:

DCLRT=[(32.2*60/1.6878)/6076.1154]*[(DESRAT-500)/TGTGSP]

where DESRAT, the descent rate of the aircraft at the start of the descent segment, is obtained from a lookup table in computer 38; and TGTGSP equals TGTSPD (SPDaltPTR) converted to true airspeed. DESRAT is calculated in a known manner utilizing the aircraft calibrated airspeed prior to deceleration, the altitude of segment lower end point, as well as the projected gross weight of the aircraft TGTGWT(L) at the segment lower end point.

Figure 11:
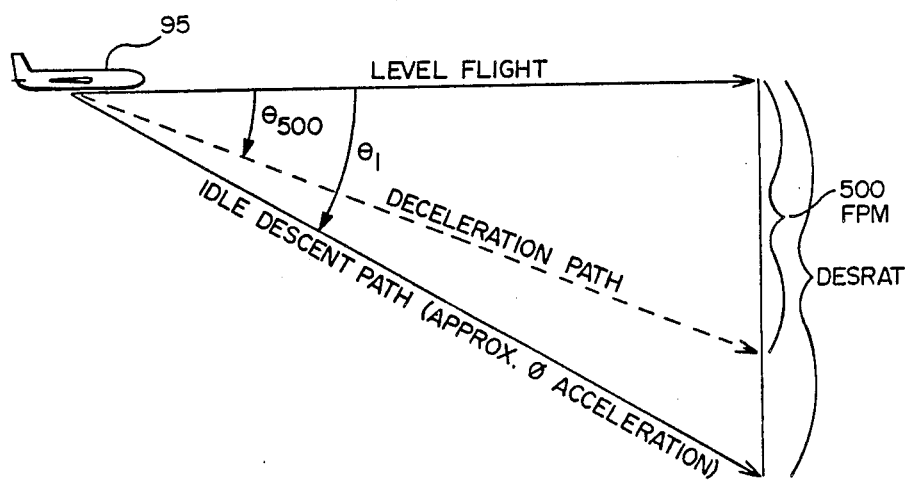
FIG. 11 is a diagram showing the calculation of the aircraft deceleration rate.

The deceleration rate (DCLRT) is derived by referring to FIG. 11 where the flight of an aircraft 95 is defined by three flight paths including (i) a level flight path (ii) a deceleration flight path which represents the deceleration path at a descent rate of 500 feet per minute and (iii) a clean, idle descent path flown at a constant calibrated airspeed. In FIG. 11, $\theta_1$, represents the angle between the level flight path and the idle descent path, and $\theta_{500}$ represents the angle between the level flight path and the deceleration path.

A deceleration force ($F_D$), resulting when the aircraft's rate of descent is decreased to 500 feet per minute, is calculated as:

$F_D = L \tan(\theta_1 - \theta_{500})$ where L=aircraft lift. Since it is known that F=ma, then $$DCLRT = \frac{F_D}{m} = \frac{L \tan(\theta_1 - \theta_{500})}{m}$$

where m=the mass of the aircraft. Assuming small angles of $\theta_1$ and $\theta_{500}$ $\tan(\theta_1 - \theta_{500}) = \theta_1 - \theta_{500}$.
Therefore, $$DCLRT = \frac{L(\theta_1 - \theta_{500})}{m}$$

It is also known that L=W cos t where W=the weight of the aircraft and t=the inclination of the flight path to the horizontal.
Assuming for small angles of descent that cos t=1, then

L=W.

Therefore:

L=gm and

DCLRT=g($\theta_1 - \theta_{500}$).

Assuming small angles of $\theta_1$ and $\theta_{500}$, then $$\theta_1 = \frac{DESRAT}{TGTGSP}$$

and $$\theta_{500} = \frac{500}{TGTGSP}$$

Therefore:

$$DCLRT = \frac{g(DESRAT - 500)}{TGTGSP}$$

Since it is known that g=32.2 feet/second=32.2*60 (feet/minute); and

TGTGSP in knots=TGTGSP * 6076.1154 * 1.6878 (feet/minute), then

DCLRT=[(32.2*1.6878)/6076.1154]*[(DESRAT-500)/TGTGSP]

Once the deceleration rate is determined, then the time to decelerate from TGTSPD(SPDaltPTR) to TGTSPD(L) i.e. deceleration time (DCLT), is calculated as the change in ground speed ($\Delta$KGSP) divided by DCLRT. By multiplying the deceleration time by the predetermined descent rate of 500 feet per minute (NOMDCLRT), the change in altitude component, $\Delta$alt, is determined. More specifically:

$$\Delta alt = DCLT * NOMDCLRT * 60 * \frac{1}{3600}$$

In order to compute the change in distance component, $\Delta$dtg, of the deceleration leg, the deceleration time (DCLT) is multiplied by the calculated average ground speed of the aircraft during the deceleration leg, i.e. the aircraft groundspeed at the end of deceleration [TGSSPD(L)] added to one half the change in ground speed of the aircraft during deceleration (0.5 * $\Delta$GSP). Change in groundspeed is calculated by converting TGTSPD at an altitude midpoint of the segment to true airspeed (VTRUE), converting this quantity to a groundspeed in accordance with projected prevailing winds, and subtracting from that quantity the projected groundspeed TGTSPD(L) at the lower end of the segment. TGTSPD(L) is calculated in a conventional manner on the basis of calculated true airspeed and projected prevailing winds at the segment lower end. More specifically:

$$\Delta dtg = DCLT * [TGTSPD(L) + (.5 * \Delta GSP)] * \frac{1}{3600}$$

The values of $\Delta$alt and $\Delta$dtg are then added to the previous dtg and alt values stored in the distance to go array and descent trajectory altitude arrays.

On the other hand, returning to FIG. 10A, if the condition is satisfied that the first segment of the lower leg is a constant airspeed segment, i.e. TGTSPD(L) is not less than TGTSPD(SPDaltPTR), then each segment of the constant airspeed leg is defined by a 3,000 foot change in altitude $\Delta$alt, or until the next upper point corresponding to an airspeed/altitude transition is reached, whichever occurs first. Therefore the determination is made whether the altitude of the upper cardinal transition, e.g., transition #3 in FIG. 6 (10,000 feet/250 KIAS), minus the altitude of the lower endpoint of the current segment, is less than 3,000 feet. If the difference is greater than or equal to 3,000, an altitude increment of 3,000 is utilized. If the change is less than 3,000, then Δalt is equal to the difference between the altitude of the next upper transition and the altitude of the lower endpoint of the current segment.

In order to calculate Δdtg, the descnnt rate of the aircraft is retrieved from computer 38. This descent rate corresponds to a descent rate at a point midway between the upper and lower altitudes defining each constant airspeed segment. The time for the aircraft to descend between the aforementioned upper and lower altitudes (DCLT) is computed by dividing Δalt by the aircraft descent rate. During a constant calibrated airspeed descent, the aircraft ground speed decreases by an amount equal to the difference between the calibrated airspeed at the upper and lower altitudes of the endpoints which define the segment. To compute the change in distance to go during a constant airspeed descent, the aircraft groundspeed at the lower end of the constant airspeed segment [TGTGSP(L)] is added to one half the change in ground speed (ΔGSP) during the segment to arrive at an aircraft average ground speed during the constant airspeed segment. This average ground speed is multiplied by the time of descent (DCLT) to generate Δdtg. More specifically, $$\Delta dtg = DCLT * [TGTGSP(L) + 0.5 * \Delta GSP] * \frac{1}{3600}$$

After determining Δdtg and Δalt, these values are added to the previously arrayed values of Δdtg and Δalt, and their sum is stored in the dtg and alt arrays under their respective indexes.

After updating the arrays, a determination is made whether the latest altitude stored in the alt array is equal to the assigned cruise altitude. If they are equal, the entire descent profile has been calculated. However, if they are not equal, then a determination is made whether the latest stored value of alt is equal to the altitude at the next upper transition. If these two values are equal at decision block 93 (FIG. 10B), then dtg, alt for all of the segments of the present leg have been determined and the variables TGTalt(L), TGTSPD(L), TGTGWT(L) AND TGTGSP(L) are updated, SPDaltPTR is incremented to the next transition point cardinal number, e.g., transition point 2, and TGTGSP is updated. Otherwise, if the decision is "no" at block 93, TGTalt(L), TGTSPD(L) and TGTGSP(L) are updated to calculate Δdtg, Δalt for additional segments of that leg. Once the variables are updated, the program returns to repeat the aforementioned calculations beginning with a determination as to whether the next segment is a constant airspeed segment or a deceleration segment.

VI. GENERATION OF THE VERTICAL FLIGHT PATH PROFILE DISPLAY

Having generated a top of climb profile point defined by an DTG$_P$, ALT$_P$ pair, and a top of descent profile point defined by another DTG$_P$, ALT$_P$ pair, a cruise profile is generated by a line segment connecting the top of descent and top of climb profile points.

Figure 12:
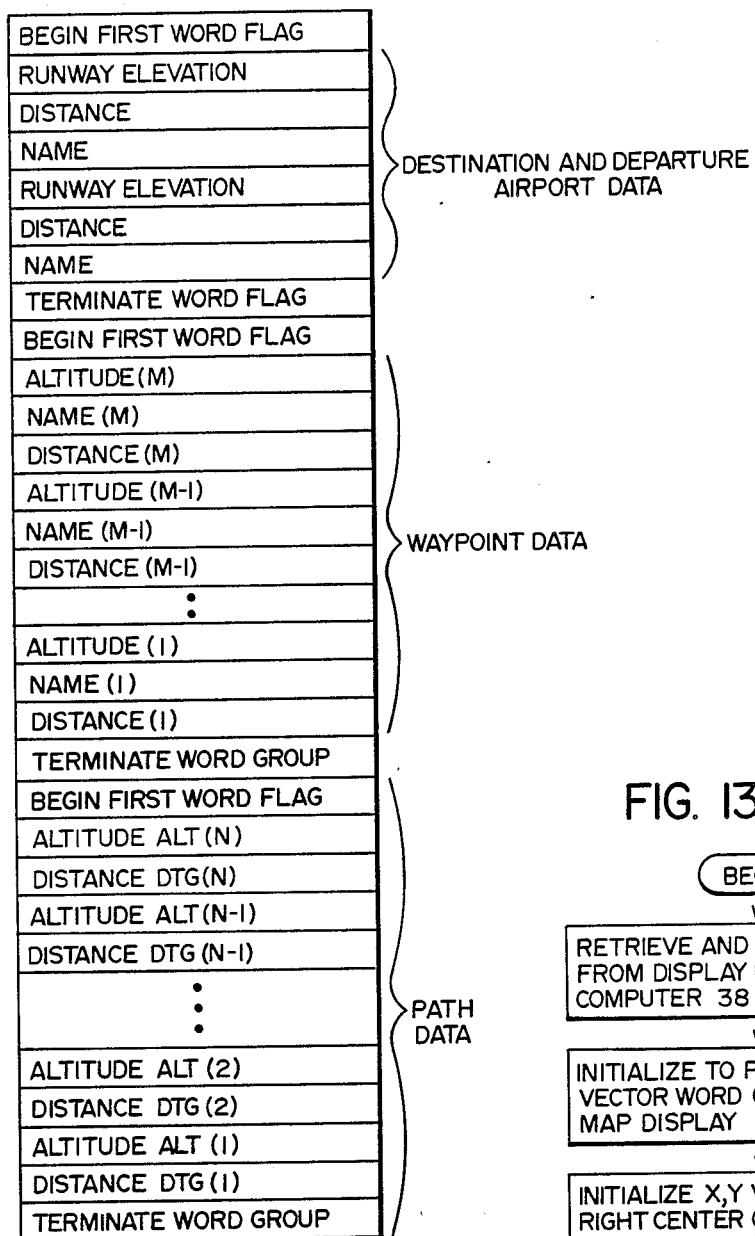
FIG. 12 is a diagram of airport, waypoint and path data loaded in a display buffer.

Once the positions of the profile points 32, destination and departure airports are defined in terms of the respective DTG$_P$, ALT$_P$ pairs, each pair is initialized beginning with cardinal number 1, and they are loaded into a display buffer in computer 38 in reverse order as shown in FIG. 12. For transmission over the data bus to the symbol generator 44, the display buffer data is converted into ARINC 429 format.

In the present invention, the profile points 32 are positioned on screen 45 relative to the airplane symbol 34. This is accomplished by first retrieving the most recent value of TDTG$_A$ from the data bus, and comparing TDTG$_A$ to the DTG$_P$ of each set of adjacent profile points to locate the aircraft position between an adjacent set of profile points, e.g. n, n−1.

The value of TDTG$_A$ is obtained by calculating a first distance $D_1$ which is the distance between the aircraft and the closest succeeding waypoint along the route of flight, and adding $D_1$ to $D_2$, which is the sum of the distances between the closest succeeding waypoint and the destination airport along the route of flight. As may be recalled, waypoints are locations stored conventionally in computer 38 by their latitude and longitude or as a bearing and distance from a known latitude/longitude. These waypoints are used conventionally to define a selected course over the ground for the aircraft to fly as described more fully in applicants' co-pending application Ser. No. 716,979 entitled "AIRCRAFT NAVIGATIONAL SYSTEMS AND METHODS FOR CREATING NAVIGATIONAL GUIDE POINTS"; the contents of which are incorporated by reference herein in their entirety. Calculation of $D_1$ is accomplished by first calculating the great circle distance between the present position of the aircraft and the the next waypoint. This great circle distance is calculated in a conventional manner utilizing the present latitude/longitude of the aircraft as received from the aircraft inertial navigation system and the latitude/longitude of the next waypoint along the route of flight. Similarly, the great circle distances between each set of adjacent waypoints is calculated utilizing the latitudes and longitudes of the adjacent waypoints.

Figure 13A:
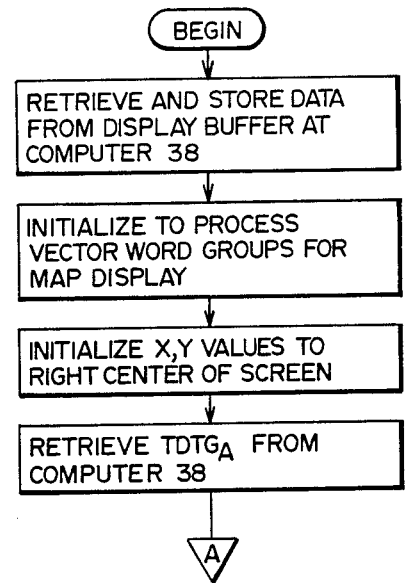
FIGS. 13A, 13B and 13C are flow charts for processing the ALT, DTG data to generate and display the vertical profile segments relative to the aircraft symbol.
Figure 13B:
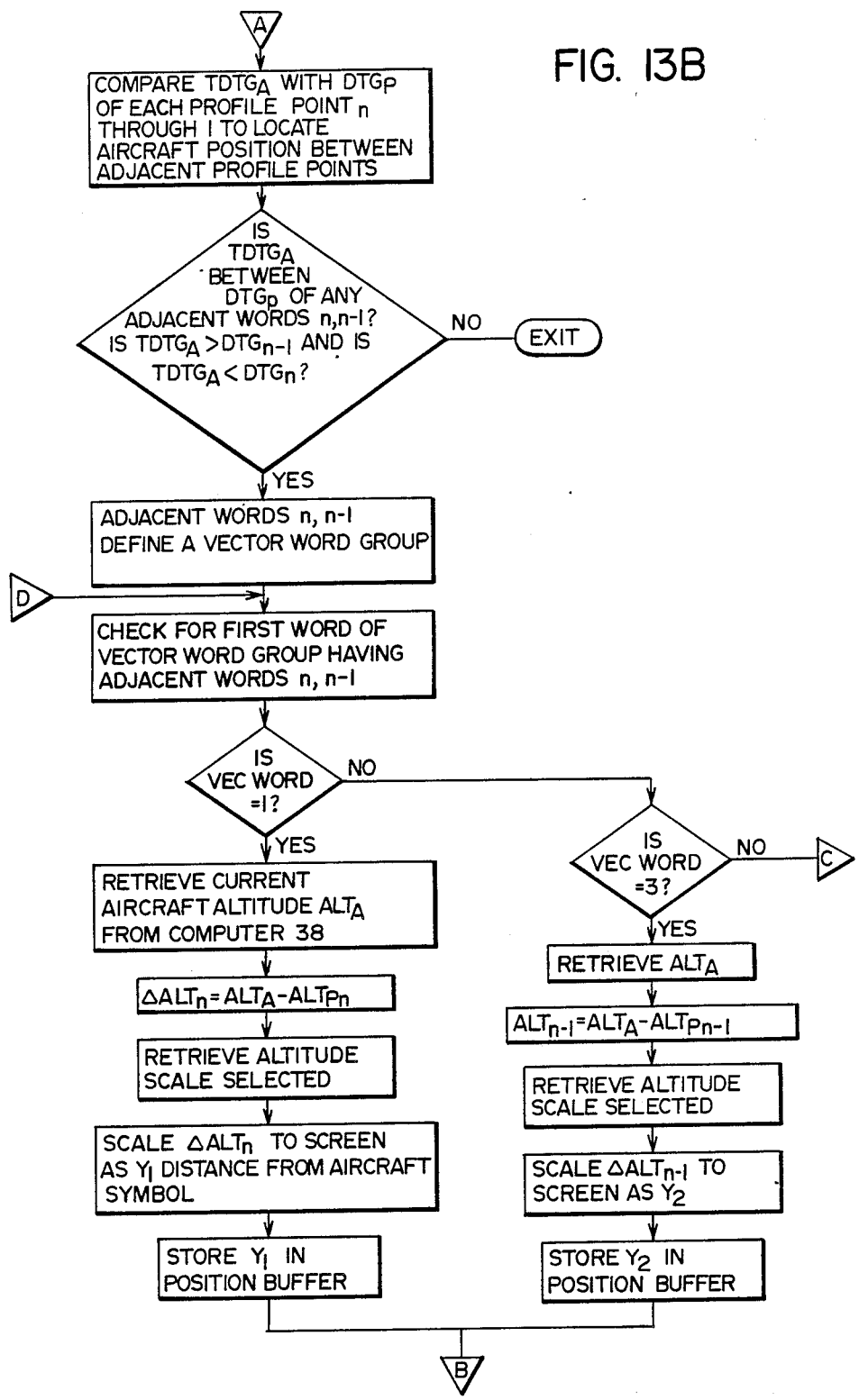
Figure 13C:
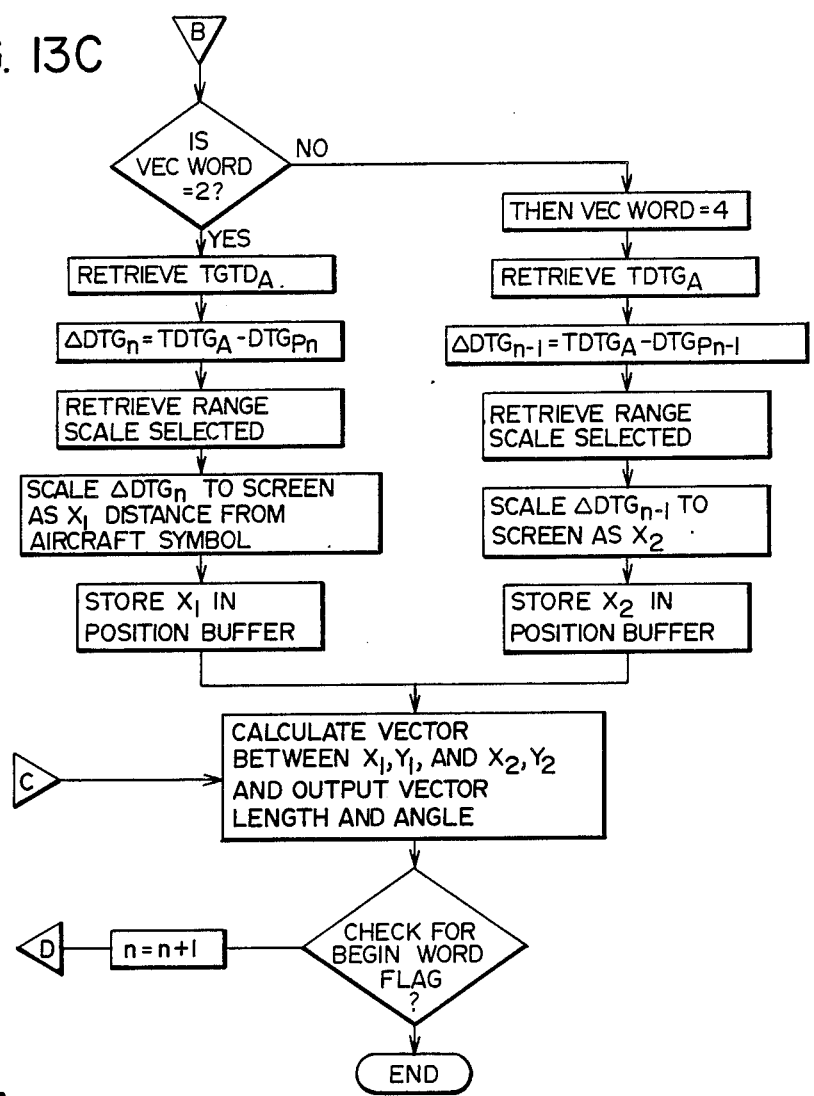
Figure 14:
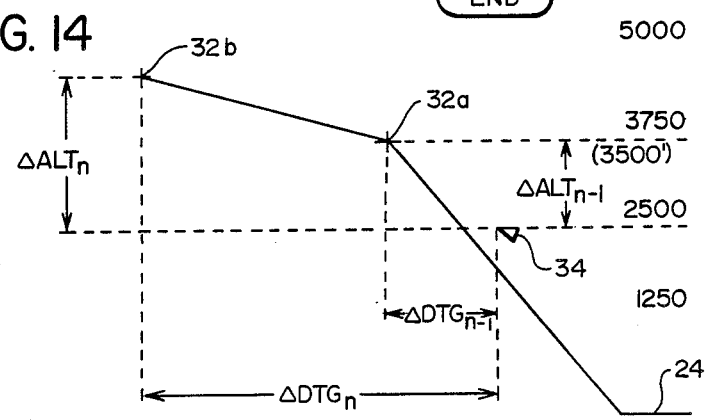
FIG. 14 is a schematic representation explaining the positioning of the flight path profile relative to the aircraft symbol on the display.

Having established the position of the aircraft between an adjacent set of profile points 32$_n$, 32$_{n-1}$, the position of these profile points from the aircraft symbol 34 is calculated. This is accomplished in accordance with a procedure set out in greater detail in the flow charts of FIGS. 13A through 13C. Briefly, due to their arranged order in the display buffer, it is known that the ALT components of profile points 32$_n$, 32$_{n-1}$ occupy the first and third words, respectively, of the vector word group. Altitude differentials ΔALT between current aircraft altitude and profile point altitude are calculated. These values are then scaled to the altitude scale selected at unit 46 for display on the screen, and the scaled values are stored in a position buffer. Likewise, distance to go differentials ΔDTG, between the TDTG$_A$ and DTG$_P$ of each profile point are calculated. These values are also scaled and these scaled values stored in the position buffer. For example, referring to FIG. 14, assume (1) the selected range scale is ten miles and the corresponding altitude scale is from zero to 5000 feet, and (2) at the the ten mile range scale, two miles in range equals one inch in horizontal distance on screen 45, and 1000 feet equals one inch of vertical distance on the screen 44. If a calculated value of ΔDTG, ΔALT is two miles, 1000 feet, respectively, then the corresponding profile point 32$a$ is located at a horizontal distance of one inch and a vertical distance of one inch from the fixed aircraft symbol 34.

Figure 15:
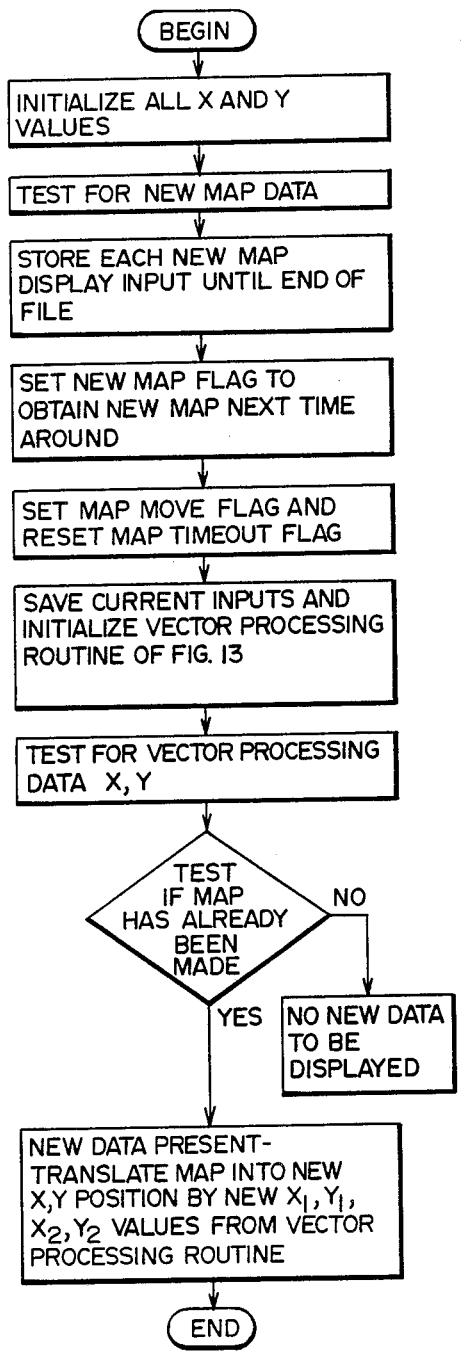
FIG. 15 is a flow chart for generating a moving map display of the vertical profile.

In order to locate the next succeeding profile point 32$b$ on the screen 45 relative to the aircraft symbol 34, the difference in altitudes, ΔALT, between profile point 32b and aircraft altitude, as well as the difference between $TDTG_A$ and the $DTG_P$ of the profile point 32b are calculated. The resulting values of $\Delta DTG$, $\Delta ALT$ for profile point 32b are then scaled to the selected range and altitude scale displayed at screen 45, and profile point 32b is positioned on the screen relative to the aircraft symbol 34. The positions of the remaining profile points 32 as well as the destination airport and departure airport are positioned on the screen relative to the aircraft symbol 34 in a similar manner. By continuously updating the values of $\Delta DTG$, $\Delta ALT$ for each profile point as the aircraft continues along its projected flight path, the positions of the profile points 32 are updated relative to the aircraft symbol 34 to provide the left to right movement of the vertical flight path profile across the screen 45 and past the fixed aircraft symbol 34. Movement of the vertical profile relative to the aircraft symbol is accomplished by a conventional map driver routine which is set forth in the flow chart in FIG. 15, and will not be described in further detail. Furthermore, a method of generating a moving map display is also discussed in U.S. Pat. No. 3,899,662 by Kreeger et al. entitled "METHOD AND MEANS FOR REDUCING DATA TRANSMISSION RATE IN SYNTHETICALLY GENERATED MOTION DISPLAY SYSTEMS".

Figure 16:
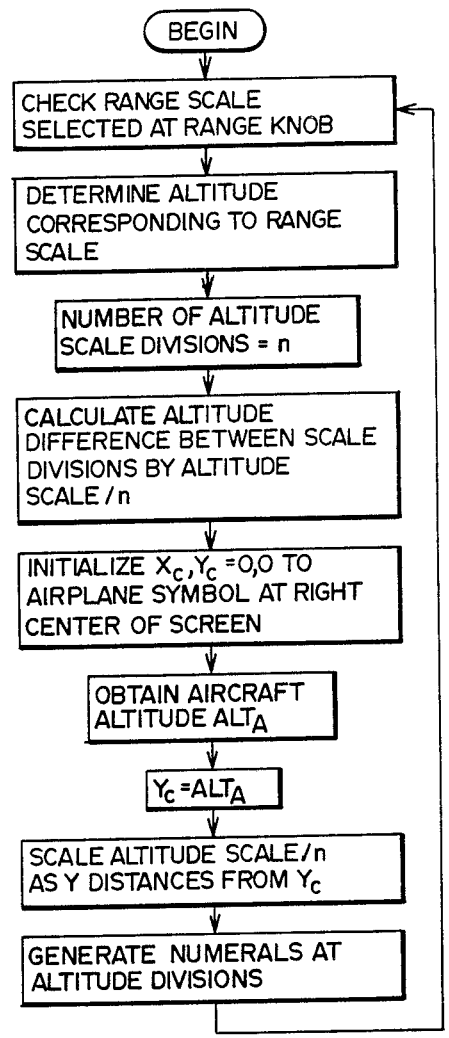
FIG. 16 is a flow chart for generating a moving altitude scale tape.

To provide the pilot with an accurate numerical presentation of aircraft position with respect to the vertical profile, the altitude tape 56 (FIG. 3) changes with a change in selected altitude scale at unit 46 or a change in aircraft altitude. The generation of the moving altitude tape is accomplished in a conventional manner as set forth in the flow chart of FIG. 16. Briefly, the selected altitude scale is checked, and this scale is divided by the number of altitude divisions to generate an altitude differential between each altitude division. The scale of feet (altitude) per screen (inch) for the selected altitude scale is retrieved and multiplied by the altitude per division interval to locate the altitude divisions at the proper distances from the aircraft symbol on the display screen. The selected altitude scale is continuously checked along with the aircraft altitude to update the scaled division interval values as well as the aircraft altitude values displayed adjacent to the aircraft symbol 34. By observing the position of the aircraft symbol 34 and vertical profile relative to the altitude scale 56, the pilot is provided with a quantitative readout of aircraft altitude, as well as the altitude differential between the aircraft and the vertical profile. A quantitative display of aircraft diStance from the profile points is provided by the range scale 60. Range scale 60, which is generated in a conventional manner similar to altitude scale 56, will not be described further herein.

VII. CREATION OF A CLIMB OR DESCENT TREND VECTOR

In an exemplary embodiment of the present invention there is provided a trend vector at screen 45 to indicate aircraft predicted position at selected look ahead time intervals. The trend vector is displayed as a line 101 (FIG. 17) which extends from the nose of the aircraft symbol 34 and is calculated as a function of present aircraft airspeed and flight path angle. The aircraft symbol 34 which has a triangular configuration, includes an apxx 102 which represents the nose of the aircraft. The trend vector may display predicted aircraft position at six second, thirty second, sixty second and ninety second look ahead times. Typically, a six second trend vector will be displayed on the 2.5 and 5 mile range scales, a thirty second trend vector on the 10 mile range scale, a sixty second trend vector on the 20 mile range scale, and a ninety second trend vector on the 40, 80, 160 and 320 range scales. The end of the trend vector line 101 represents the predicted position of the aircraft from its present position at the selected look ahead time. In the display shown in FIG. 17, the pilot can observe on the screen 45 that the aircraft is slightly below the selected flight path during the descent. The pilot is made aware that a decrease in the rate of descent is necessary to intercept and remain on the descent profile segment 104. By observing the display, the pilot will also observe that by maintaining the present airspeed and flight path angle for thirty seconds, the aircraft will reach the ground. Other uses of the trend vector include supplying information to the pilot as to predicted aircraft position to facilitate transitioning from a climb or descent mode to a level off mode, as well as to facilitate transitioning to various airspeed/altitudes such as the CAS to MACH transition.

In order to calculate the length of the trend vector line 101 from the nose of the aircraft symbol 34, as well as the angle of the trend vector, reference is made to FIG. 18. Initially a horizontal component, $TRV_{H30}$, of the thirty second trend vector is computed from the formula $TRV_{H30} = GSP * t_{30}$, where GSP is aircraft groundspeed which is calculated conventionally from aircraft airspeed and prevailing winds, and $t_{30}$ is a look ahead time of thirty seconds. The trend vector $TRV_{30}$ is then calculated by the formula $TRV_{30} = TRV_{H30}$ (converted to inches)/cos $\gamma$, where $\gamma$ is aircraft flight path angle retrieved from computer 38.

Having calculated the length of the trend vector displayed on the screen 45, computation of the trend vector angle $\gamma'$ (FIG. 20) for display of the trend vector at screen 45, is accomplished by the equation $\gamma' = ARCTAN (TAN \gamma * H_{SCALE}/D_{SCALE})$ in which $H_{SCALE}/D_{SCALE}$ is the ratio of the selected vertical altitude scale of the screen, to the horizontal scale. In other words, H scale equals the number of altitude feet which are displayed in one vertical inch at screen 45, and D scale equals the number of miles which are displayed in one horizontal inch at screen 45; H scale and D scale also being a function of the range scale and altitude scale selected at unit 46.

In order to display the selected trend vector, reference is made to the flow chart in FIG. 19 and to the diagram in FIG. 20. At block 110 of the flow chart, the values of B1, B2 and B3 which represent the distances between the six second and thirty second, thirty second and sixty second, and sixty second and ninety second trend vectors, respectively, are given. The thirty second trend vector $TRV_{30}$ is then calculated in the manner discussed previously and the length of the six second trend vector line 101a (FIG. 20) is determined by multiplying by the value 0.2. Then the length of the thirty second trend vector line 101b is calculated by subtracting the sum of the line separation B1 and the six second line 101a from the thirty second trend vector value $TRV_{30}$.

Whereas the six second and thirty second trend vector lines are always displayed on the screen when the vertical profile mode has been selected, the sixty second trend vector is only displayed for selected ranges of ten nautical miles or greater. Therefore, if the decision at block 118 is "yes", the trend vector line 101c for the sixty second look ahead is calculated by adding a trend vector line equal to the length of the thirty second line 101b, and separated by the distance B2.

Similarly, if a range scale greater than or equal to twenty nautical miles is selected, meaning a "yes" at decision block 122, then another trend vector line 101d equal to the length of the thirty second trend vector line 101b is added to the end of line 101c and separated by the distance B3 to generate the ninety second trend vector. The trend vector angle $\gamma'$ is then calculated in the manner discussed previously.

Utilizing the Collins symbol generator of the preferred embodiment which has a General Graphics System (GGS) package, the inputs of the trend vector angle $\gamma'$ and vector length are fed to the symbol generator to locate and display the trend vector.

What is claimed is:

1. A method of generating an informational profile for guiding an aircraft flight, the method comprising the steps of:
   a. providing information concerning locations of an earlier position $P_1$ and a later position $P_4$, as well as aircraft first operating parameters for conducting a climb from the earlier position $P_1$ and aircraft second operating parameters for conducting a descent to the later position $P_4$;
   b. calculating a location of an upper descent position $P_3$ from the later position $P_4$ as a function of a projected distance to be flown by the aircraft when descending to position $P_4$ in accordance with the aircraft second operating parameters;
   c. calculating a location of an upper climb position $P_2$ from earlier position $P_1$ as a function of a projected distance to be flown by the aircraft when climbing to the upper climb position $P_2$ from position $P_1$ in accordance with the aircraft first operating parameters;
   d. generating the informational profile which is defined by a climb portion including positions $P_1$ and $P_2$, a descent portion including positions $P_3$ and $P_4$, and an intermediate portion including positions $P_2$ and $P_3$; and
   e. guiding said aircraft based on the generated informational profile.

2. The method as set forth in claim 1 wherein:
   a. the locations of positions $P_1$ and $P_4$ are defined relative to a position on the earth; and
   b. the location of position $P_2$ is calculated relative to position $P_1$, and the location of position $P_3$ is calculated relative to position $P_4$.

3. The method as set forth in claim 2 wherein:
   a. the projected distance to be flown by the aircraft includes a vertical altitude component and a horizontal distance component.

4. The method as set forth in claim 3 wherein the first operating parameters include an aircraft airspeed requirement which is a function of aircraft altitude.

5. The method as set forth in claim 2 wherein the first operating parameters include an altitude requirement for conclusion of the climb portion at position $P_2$, and an aircraft airspeed requirement during the climb to position $P_2$.

6. The method as set forth in claim 1 wherein:
   a. the location of position $P_2$ from position $P_1$ is a function of aircraft third and fourth operating climb parameters for conducting the climb; and
   b. the climb portion is formed by at least lower and upper climb legs, in which the lower climb leg includes the earlier position $P_1$ and an intermediate climb position $P_5$, and in which the upper leg includes the intermediate climb position $P_5$ and the upper climb position $P_2$, in a manner that a location of position $P_5$ is calculated relative to the earlier position $P_1$ as a function of the third operating climb parameters, and the location of the upper climb position $P_2$ is calculated relative to the intermediate climb position $P_5$ as a function of the fourth operating climb parameters.

7. The method as set forth in claim 6 wherein:
   a. the location of intermediate climb position $P_5$ is a function of a first projected horizontal distance component and a first projected altitude component to be flown by the aircraft when climbing from the earlier position $P_1$ in accordance with the third operating climb parameters; and
   b. the location of upper climb position $P_2$ is a function of a second projected horizontal distance component and a second projected vertical altitude component to be flown by the aircraft when climbing from the intermediate climb position $P_5$ in accordance with the fourth operating climb parameters.

8. The method as set forth in claim 7 wherein:
   a. the intermediate climb position $P_5$ is located from the earlier position $P_1$ at a horizontal distance and vertical altitude which are equal to the first projected distance component and the first projected altitude component; and
   b. the upper climb position $P_2$ is located from the intermediate climb position $P_5$ at a horizontal distance and vertical altitude which are equal to the second projected distance component and the second projected altitude component.

9. The method as set forth in claim 7 wherein the aircraft third operating clmmb parameters include a first aircraft airspeed, and the fourth operating climb parameters include a second aircraft airspeed which is different from the first aircraft airspeed so that the lower climb leg and the upper climb leg have different slopes.

10. The method as set forth in claim 1 wherein:
    a. the location of the upper descent position $P_3$ from the later position $P_4$ is a function of fifth and sixth operating parameters for conducting the descent; and
    b. the descent portion is formed by at least upper and lower descent legs, in which the lower descent leg includes the later position $P_4$ and an intermediate descent position $P_6$, and the upper leg includes the intermediate descent position $P_6$ and the upper descent position $P_3$, in a manner that a location of intermediate position $P_6$ is calculated relative to the later position $P_4$ as a function of the fifth operating descent parameters, and the location of the upper descent position $P_3$ is calculated relative the intermediate descent position $P_6$ as a function of the sixth operating descent parameters.

11. The method as set forth in claim 10 wherein:
    a. the location of intermediate position $P_6$ is a function of a projected horizontal distance component and a projected vertical altitude component to be flown by the aircraft when descending to the later position $P_4$ in accordance with the fifth operating descent parameters; and
    b. the location of position $P_3$ is a function of projected horizontal distance component and a projected vertical altitude component to be flow by the aircraft when descending to position $P_6$ in accordance with the sixth operating descent parameters.

12. The method as set forth in claim 11 wherein the aircraft fifth operating descent parameters include a third aircraft airspeed, and the sixth operating descent parameters include a fourth aircraft airspeed which is different from the third aircraft airspeed so that the lower descent leg and the upper descent leg have different slopes.

13. The method as set forth in claim 1 additionally comprising the step of displaying the informational profile and a symbol of the aircraft at locations relative to each other to indicate the position of the aircraft relative to the profile.

14. The method as set forth in claim 13 additionally comprising the step of displaying a trend symbol at a location relative to the aircraft symbol to indicate a predicted location of the aircraft at a selected time in the future as a function of aircraft present airspeed and aircraft present flight path angle.

* * * * *